US009885633B2

(12) United States Patent
Lally et al.

(10) Patent No.: US 9,885,633 B2
(45) Date of Patent: Feb. 6, 2018

(54) DISPERSION CORRECTION IN OPTICAL FREQUENCY-DOMAIN REFLECTOMETRY

(71) Applicant: INTUITIVE SURGICAL OPERATIONS, INC., Sunnyvale, CA (US)

(72) Inventors: Evan M. Lally, Blacksburg, VA (US); Justin W. Klein, Christiansburg, VA (US); Mark E. Froggatt, Blacksburg, VA (US); Emily E. H. Templeton, Blacksburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 142 days.

(21) Appl. No.: 14/654,903

(22) PCT Filed: Dec. 24, 2013

(86) PCT No.: PCT/US2013/077711
§ 371 (c)(1),
(2) Date: Jun. 23, 2015

(87) PCT Pub. No.: WO2014/105911
PCT Pub. Date: Jul. 3, 2014

(65) Prior Publication Data
US 2015/0346053 A1 Dec. 3, 2015

Related U.S. Application Data

(60) Provisional application No. 61/745,679, filed on Dec. 24, 2012.

(51) Int. Cl.
*G01B 9/02* (2006.01)
*G01M 11/00* (2006.01)
*G01D 5/353* (2006.01)

(52) U.S. Cl.
CPC ........ *G01M 11/3145* (2013.01); *G01B 9/0207* (2013.01); *G01D 5/35358* (2013.01); *G01D 5/35393* (2013.01)

(58) Field of Classification Search
CPC ............ G01M 11/3145; G01B 9/0207; G01D 5/35358; G01D 5/35393
See application file for complete search history.

(56) References Cited

U.S. PATENT DOCUMENTS 7,515,276 B2    4/2009  Froggatt et al.
8,018,598 B2    9/2011  Cense et al.
(Continued)

FOREIGN PATENT DOCUMENTS

JP    2005283155 A    10/2005
WO    WO-2011153126 A2    12/2011

OTHER PUBLICATIONS

International Search Report for PCT/US2013/077711 dated Apr. 16, 2014, three pages.
(Continued)

*Primary Examiner* — Hwa Lee
(74) *Attorney, Agent, or Firm* — Nixon & Vanderhye P.C.

(57) ABSTRACT

An optical frequency domain reflectometry (OFDR) measurement is produced from an OFDR apparatus that includes a tunable laser source coupled to a sensing interferometer and a monitor interferometer. The sensing interferometer is also coupled to a waveguide, e.g., an optical sensing fiber. Sensor interferometric data obtained by the OFDR measurement is processed in the spectral domain (e.g., frequency) with one or more parameters to compensate for the optical dispersion associated with the sensing interferometer data. A Fourier Transform of the dispersion-compensated sensing interferometric data in the spectral domain is performed to
(Continued)

provide a dispersion-compensated OFDR measurement information in the temporal (e.g., time) domain.

25 Claims, 22 Drawing Sheets

(56) References Cited

U.S. PATENT DOCUMENTS

2003/0035608 A1   2/2003   Zhang et al.
2008/0181477 A1   7/2008   Izatt et al.
2010/0245836 A1   9/2010   Kulkarni et al.
2011/0109898 A1   5/2011   Froggatt et al.
2012/0086934 A1   4/2012   Digonnet et al.

OTHER PUBLICATIONS

Written Opinion of the ISA for PCT/US2013/077711 dated Apr. 16, 2014, six pages.
Extended European Search Report for Application No. 13867656.4, dated Jul. 1, 2016, 8 pages.

DISPERSION CORRECTION IN OPTICAL FREQUENCY-DOMAIN REFLECTOMETRY

This application is the U.S. national phase of International Application No. PCT/US2013/077711 filed 24 Dec. 2013 which designated the U.S. and claims priority to U.S. Provisional Application No. 61/745,679 filed 24 Dec. 2012, the entire contents of each of which are hereby incorporated by reference.

TECHNOLOGY OVERVIEW

The technology relates to fiber optic group velocity dispersion in distributed sensing systems that use optical frequency-domain reflectometry (OFDR).

BACKGROUND

Optical frequency-domain reflectometry (OFDR) is technique through which a swept-wavelength laser source is used to discriminate between different locations along the length of an optical fiber. OFDR measurements can be used in applications including sensing distributed temperature and/or strain in optical fibers and determining the location of bends, reflections, and faults in fiber optic networks with high spatial resolution. Being a form of swept-wavelength interferometry, OFDR also provides a spectral characterization of each reflector or scattering location in the fiber (in addition to positional information) from which a variety of distributed fiber optic sensing techniques based on OFDR have been developed. Distributed OFDR measurements can be performed with several optical fiber scattering types such as using multiple discrete or continuous fiber Bragg gratings (FBGs) or the intrinsic pattern of Rayleigh scatter in the optical fiber to measure temperature, strain, shape and position, and other physical phenomena.

Optical dispersion, often referred to as Group velocity dispersion (GVD), exists to some degree in all optical waveguides and causes degradation in the coherence of the OFDR signal. Optical dispersion causes a smearing of the amplitude response of the fiber making it difficult to distinguish reflective events in an OFDR measurement. Further, optical dispersion prevents distributed sensing applications from being able to properly match a location in a measurement scan, (which corresponds to a delay along the length of a measurement), to the same location in a baseline measurement of the fiber. In distributed sensing applications, misalignment between an OFDR measurement scan and an OFDR baseline scan is known as differential delay. A differential delay signal can be used to make highly accurate distributed strain measurements by compensating for elongation of an optical sensor in a strained measurement. However, optical dispersion distorts this measurement of differential delay, particularly at longer sensing lengths, and causes inaccuracy or prevents distributed measurements. This reduction in OFDR measurement data quality undermines the reliability and accuracy of OFDR-based distributed sensing.

SUMMARY

The technology described in this application compensates for optical dispersions in an OFDR measurement signal to allow OFDR technology to perform accurate, fully-distributed sensing at longer as well as shorter optical fiber lengths. Example embodiments compensate for the effects of group velocity dispersion (GVD) both in a sensing fiber coupled to the OFDR apparatus and in the optical fiber and components used to construct an OFDR apparatus. This dispersion compensation is advantageous and enables reliable and accurate distributed sensing at longer lengths along the sensing fiber. Example embodiments correct for effects of GVD at a static location in the fiber and/or along a continuous length of optical fiber by reprocessing an OFDR interferometer output signal to match the dispersion characteristics of the sensing fiber. The technology reduces physical constraints on the sensing system and allows for a single OFDR system to interrogate a wide variety of sensing fibers. Specific but still example techniques are presented that determine GVD correction parameters via measurement of the delay-domain peak width or the spectral domain phase response of a discrete reflector.

Example embodiments correct an optical frequency domain reflectometry (OFDR) measurement produced from an OFDR apparatus that includes a tunable laser source coupled to a sensing interferometer and a monitor interferometer. The sensing interferometer is also coupled to an optical sensing waveguide, e.g., an optical fiber. Sensor interferometric data obtained by the OFDR measurement is processed in the spectral domain (e.g., frequency) with one or more parameters to compensate for the optical dispersion associated with the sensing interferometer data. A Fourier Transform of the dispersion-compensated sensing interferometric data in the spectral domain is performed to provide a dispersion-compensated OFDR measurement information in the temporal (e.g., time) domain.

The one or more parameters may compensate for optical dispersion at one location along the sensing waveguide, for each of multiple different optical dispersions at each of multiple locations along the sensing waveguide, or for accumulated optical dispersion along a continuous portion of the sensing waveguide.

In example embodiments, static dispersion at one point along the waveguide may be compensated for using the one or more parameters to minimize optical dispersion at one location along the sensing waveguide. In one example embodiment, sensing interferometric data obtained by the OFDR measurement is resampled based on the processed monitor interferometric data. An optical dispersion offset is determined that matches dispersion at that point along the waveguide, and the optical dispersion offset is applied to the resampled sensing interferometric data to minimize static dispersion at that point.

In example embodiments, continuous dispersion along some portion or all of the sensing waveguide may be compensated for using the one or more parameters to minimize accumulated optical dispersion along a continuous portion of the sensing fiber. A phase response of the monitor interferometer is monitored to detect when an accumulated phase reaches a threshold value. Each time it does, the threshold is modified by a linearly changing value based on a continuous dispersion compensation parameter.

Other example embodiments apply both static and continuous dispersion compensation.

Further example embodiments calibrate the OFDR apparatus including adjusting the one or more parameters while monitoring an OFDR measurement response to minimize dispersion in the OFDR measurement at one location along the sensing waveguide or to minimize the accumulated optical dispersion along a continuous portion of the sensing waveguide.

Another example embodiment determines a differential delay of the OFDR measurement along the length of the sensing waveguide relative to a baseline OFDR measurement, and processes the determined differential delay based on the one or more parameters.

Yet another example embodiment determines a coherence of the OFDR measurement along the length of the sensing waveguide relative to a baseline OFDR measurement, and processes the coherence based on the one or more parameters.

Still another embodiment reduces broadening of the OFDR measurement along the length of the sensing waveguide based on the one or more parameters.

DETAILED DESCRIPTION OF EXAMPLE EMBODIMENTS

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail. Individual blocks or other illustrations may be shown in some of the figures. Those skilled in the art will appreciate that the functions of those blocks or other illustrations may be implemented using individual electronic hardware circuits and/or using software programs and data in conjunction with a suitably programmed digital microprocessor general purpose computer, or the like.

Figure 1:
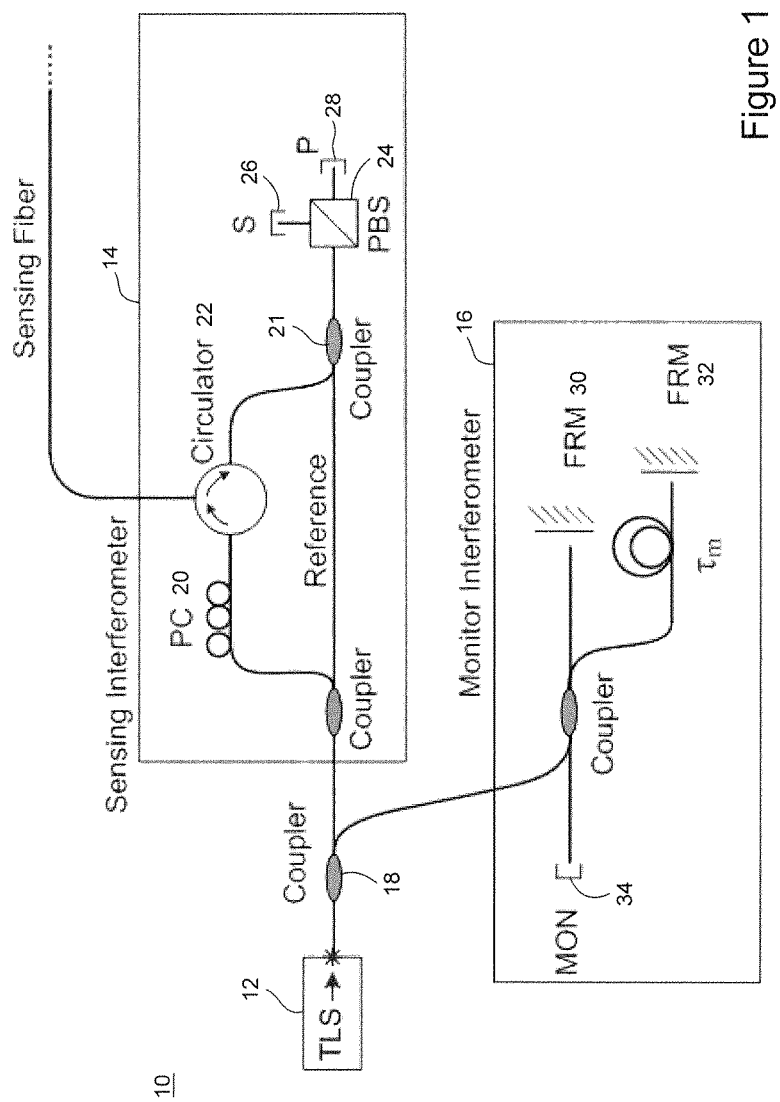
FIG. 1 shows an example OFDR optical network.

In an example OFDR network 10 shown in FIG. 1, light from a tunable laser source (TLS) 12 is launched into pair of independent optical fiber interferometers, separated by a fiber optic coupler 18. In a sensing interferometer 14, the incoming light is further split into two paths. In the upper path, the light passes through a polarization controller (PC) 20 and a circulator 22 before entering the sensing fiber. It should be understood that the sensing fiber is used in this application as a non-limiting example of a sensing waveguide to which the technology more generally applies. Along the length of the sensing fiber, small fractions of the incident light are reflected, either as a result of Rayleigh scatter or at FBGs or discrete reflectors. The reflected light propagates back down the sensing fiber, through the circulator 22, and is recombined with the incident light from the reference path at a fiber optic coupler 21. A polarization beamsplitter (PBS) 24 splits the light into two orthogonal polarization states, referred to as S and P, and the split interference pattern is detected independently at the S and P photodetectors 26, 28.

In a monitor interferometer 16, the output of the TLS 12 is again split into two paths, one of which is longer than the other. Both signals are reflected at Faraday rotator mirrors (FRMs) 30, 32, pass back through their respective interferometer arms, and are recombined at a fiber optic coupler. Finally, the interference pattern is detected at the monitor photodetector (labeled MON 34). The roundtrip time delay between the two arms of the monitor interferometer is labeled $\tau_m$. This monitor signal is used to measure small variations in the scan rate of the TLS 12, and a linearization algorithm implemented by processing electronics may be used to correct the OFDR sensing data during an acquisition. This linearization allows the OFDR network to operate beyond the coherence length of the laser 12, which is particularly advantageous for high-resolution sensing at longer sensor lengths. Example longer sensing lengths might include, but are not limited to, lengths that exceed 1 meter of optical fiber.

Equation (1) describes the time-domain OFDR signal x(t) received at either of the S or P photodetectors for a single discrete reflector in the optical sensing fiber. The reflector is located at a distance along the fiber such that the roundtrip time delay between the reflected light and the light that passes along the reference path is described by $\tau_s$. The subscript s denotes the sensing fiber. The frequency scan rate of the TLS is denoted by dv/dt, where v represents the laser's frequency and t represents time. The variable $\varphi$ accounts for the initial phase offset between the two signal paths.

$$x(t) = A\cos\left[2\pi \frac{dv}{dt}\tau_s \cdot t + \phi\right] \quad (1)$$

During the linearization process, the OFDR signal is re-sampled to convert the independent variable from units of time to units of laser frequency v. The resulting signal, assuming ideal linearization, is described below. Note that the phase constant $\tilde{\varphi}$ has been modified to incorporate terms associated with the initial laser frequency.

$$x(v) = A\cos\left[2\pi \cdot v(t) \cdot \tau_s + \tilde{\varphi}\right] \quad (2)$$

Definition of Group Velocity Dispersion.

Group velocity $v_g$ is the velocity at which energy, in the form of photons, travels along the optical fiber. It is defined as the inverse of the derivative of the propagation constant $\beta(\omega)$ vs. optical frequency $\omega$ (in radians/second). In addition to being frequency-dependent, the propagation constant $\beta(\omega)$ is determined by the material and geometrical properties of the optical fiber waveguide. Converting the units of optical frequency from radians/second to Hz yields the following expression for $v_g$ in terms of v.

$$v_g = \left(\frac{d\beta}{d\omega}\right)^{-1} = 2\pi\left(\frac{d\beta}{dv}\right)^{-1} \quad (3)$$

Group velocity dispersion (GVD) describes the phenomenon in which the group velocity $v_g$ changes with optical frequency v or wavelength $\lambda$. It is common practice in the fiber optics community to define the first-order dispersion parameter D according to the following expression [13].

$$D = \frac{d}{d\lambda}\left(\frac{1}{v_g}\right) \quad (4)$$

Converting to units of optical frequency v (in Hz) yields the following expression for dispersion D.

$$D = -\frac{v^2}{c}\frac{d}{dv}\left(\frac{1}{v_g}\right) \quad (5)$$

Effect of Group Velocity Dispersion in OFDR Sensing Signal. Again, assuming an ideal linearization of the OFDR signal and given a signal linearly sampled vs. laser frequency, group velocity dispersion has effects as described now. Derived from the definition for group velocity, Equation (6) describes optical delay $\tau_s$ as a function of frequency v and roundtrip length $L_s$ along the sensing fiber. The next steps in this analysis focus on determining an expression for the GVD-induced variation of $\tau_s$ with v.

$$\tau_s(v) = \frac{L_s}{v_g(v)} \quad (6)$$

The derivative of delay vs. frequency can be calculated with the help of Equation (5).

$$\frac{d\tau_s}{dv} = L_s \frac{d}{dv}\left(\frac{1}{v_g}\right) = -L_s \frac{c}{v^2}D_s \quad (7)$$

In order to simplify the analysis, the derivative of delay d$\tau$/dv is assumed to be approximately constant. This first-order approximation is accomplished by defining the average laser frequency $\bar{v}$.

$$\frac{d\tau_s}{dv} \approx -L_s \frac{c}{\bar{v}^2}D_s \quad (8)$$

Equation (8) is a first-order linear ordinary differential equation. Using the canonical analytical solution technique provides an expression for dispersion-dependent optical delay $\tau(v)$. Note that the initial condition is met by defining the average group velocity $\bar{v}_g$.

$$\tau_s(v) = L_s\left(\frac{1}{\bar{v}_g} - \frac{c}{\bar{v}^2}D_s \cdot (v - \bar{v})\right) \quad (9)$$

For simplicity, several terms are combined by defining the following constants:

$$\bar{\tau}_S \equiv \frac{L_S}{\bar{v}_g} \quad (10)$$

$$E_S \equiv \frac{c}{\bar{v}^2}D_S\bar{v}_g$$

$$\tau_S(v) = \bar{\tau}_S[1 - E_S \cdot (v - \bar{v})]$$

Combining Equations (2) and (10) yields the following result for a linearized, laser-frequency-domain OFDR signal. The phase constant $\tilde{\varphi}$ is again modified to incorporate constants associated with $\bar{v}$.

$$x(v) = A\cos\left[2\pi\bar{\tau}_s(1-E_s v)v + \tilde{\varphi}\right] \quad (11)$$

In a dispersion-free fiber, a discrete reflector is expected to return an OFDR signal at a constant frequency. Calculated from Equation (11), the instantaneous frequency of the same signal in a dispersive fiber is described below. The term $\Phi_s$ represents the total time-varying phase of the OFDR sensor signal, and the instantaneous frequency $f_s$ is calculated from its derivative. Note that the total phase $\Phi_s$ is quadratic with respect to v.

$$\Phi_s(v) = 2\pi\bar{\tau}_S(1 - E_S v)v + \tilde{\phi} \qquad (12)$$

$$f_s(v) = \frac{1}{2\pi} \cdot \frac{d}{dv}(\Phi_s(v)) = \bar{\tau}_S(1 - 2E_S v)$$

Figure 2:
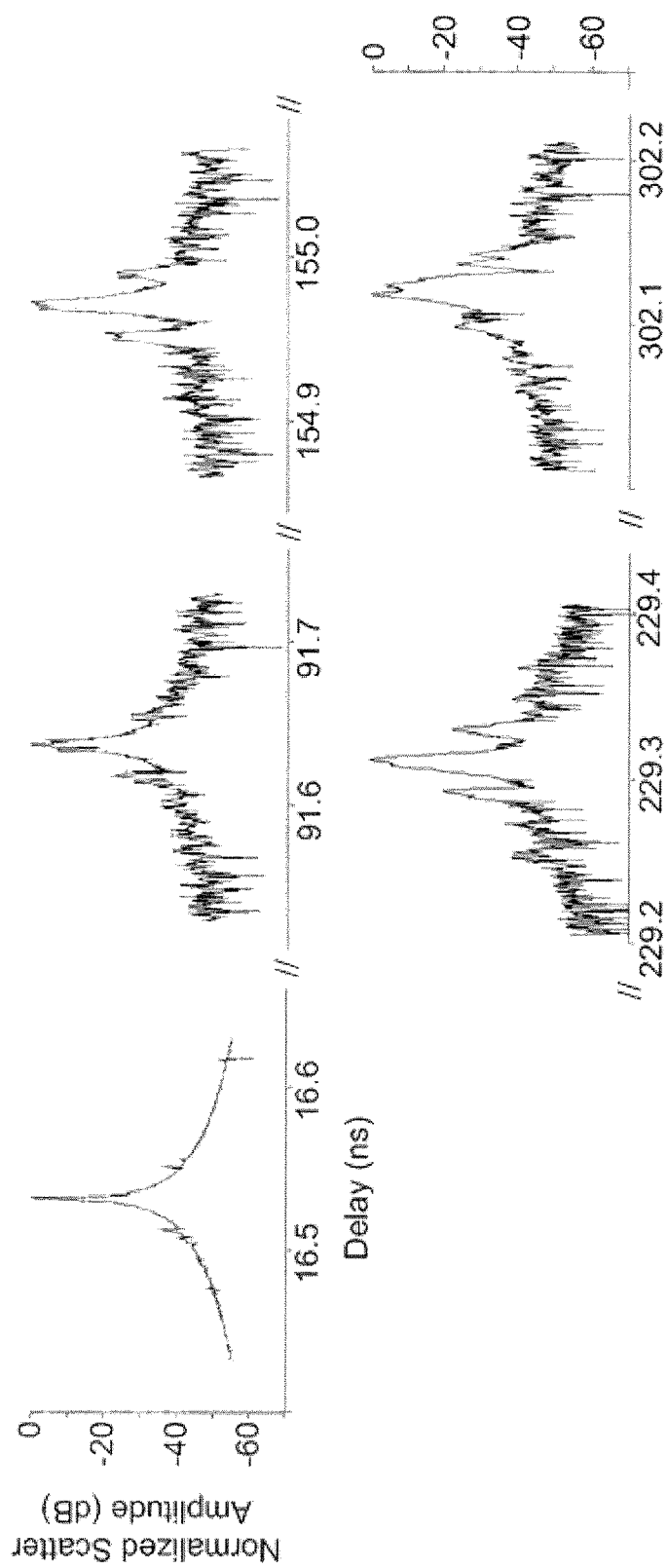
FIG. 2 shows a series of example OFDR-detected scatter amplitude for five different optical sensing fiber lengths with cleaved ends.

Although centered on its expected average value, $f_s$ varies as the laser completes its frequency scan. The result is a "chirp" in the signal which ideally is a pure frequency tone. This effect is illustrated in the example data in FIG. 2, which displays a fast Fourier transform (FFT) of OFDR scatter data in Corning SMF28 optical fiber that includes five reflectors along the fiber length. The left-most plot in FIG. 2 illustrates the reflection from a cleaved fiber end 1.65 m (16.5 ns) from the sensing system. Being a discrete point reflector, the splice is visible as a sharp peak above the Rayleigh scatter background. Because the effect of GVD is small at small values of delay $\tau_s$, the signal shows up as nearly a single tone in the FFT plot—the peak is still sharp. The other plots in FIG. 2 show detailed views of different cleaved-end SMF28 fiber samples, increasing in length from 1.65 m (16.5 ns) up to 30.2 m (302 ns) long. These discrete reflections should also ideally appear as sharp peaks in the FFT plot, but as distance increases to 30 m from the system, the fiber's GVD has blurred the delay-domain signal significantly. What should appear as a single tone has been "chirped" or smeared across a range of frequencies, i.e., the scatter amplitude is distributed over an increasing frequency band as distance along the fiber increases.

Figure 3:
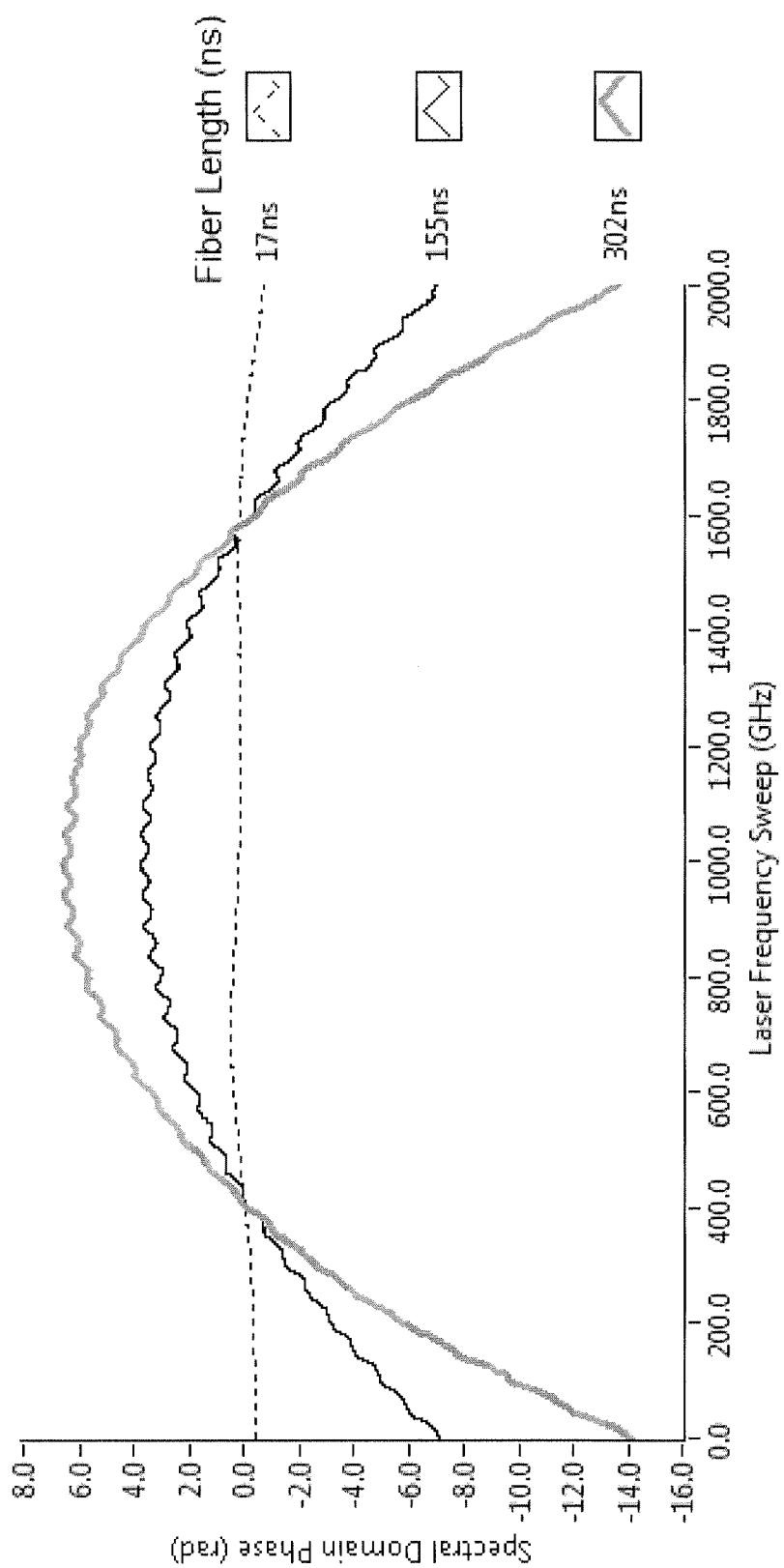
FIG. 3 shows a spectral domain phase for three of the five locations in FIG. 2.

FIG. 3 illustrates the spectral-domain phase response at three of the five reflectors tested. This response was obtained by taking the inverse FFT (IFFT) of the windowed complex data whose magnitude is shown in FIG. 2. A linear fit was subtracted from the phase of the resulting spectral domain data to remove the gross linear signal associated with the laser sweep. At the front of the fiber, where the effect of GVD mismatch is small, this phase response is relatively flat. At longer lengths, the GVD mismatch response begins to display the parabolic shape suggested by the quadratic phase term in Equations (11-12).

Although described and illustrated for discrete, single tone reflectors, this GVD effect exists across the entire spectrum of Rayleigh backscatter as well. The set of minute, distributed Rayleigh scatterers that make up the entire broadband signal experience the same chirping effect. Discrete or continuously-written Bragg gratings will also exhibit the same effect. The generalized result of GVD can be described as a loss of spatial coherence, which becomes more significant with length along the fiber.

Application of a Quadratic Phase Offset as a Static Dispersion Correction.

If there is a region of particular interest within the sensing optical fiber, then a local optical dispersion offset can be applied to correct the local effects of the GVD. This local or "static" dispersion correction alters the OFDR measurement signal such that spatial coherence is optimized at a local or static region of interest, rather than at the beginning of the fiber. Loss of coherence then grows more significant with distance from the corrected region. This local or static dispersion offset or correction flows from Equation (11) because it acts at a single discrete point in the fiber. Equation (11) is re-written in complex exponential form, allowing the GVD terms to be separated from the phase of the sinusoidal OFDR signal.

$$x(v) = \text{real}\{Ae^{i[2\pi\tau_S(1-E_S v)v+\tilde{\phi}]}\} \qquad (13)$$

$$= \text{real}\{Ae^{i[2\pi\tau_S v+\tilde{\phi}]} \cdot e^{-i[2\pi\tau_S E_S v^2]}\}$$

When the quadratic phase perturbation is separated from the desired signal, the static GVD correction may take the following form. Equation (14) describes a generalized adjustment with unity magnitude and quadratically-varying phase.

$$x'(v) = x(v) \cdot e^{i\alpha v^2}$$

$$\alpha = 2\pi\bar{\tau}_s E_s \qquad (14)$$

The desired correction $\alpha$ can now be applied. For a single discrete reflector, the equation is reduced to the ideal, dispersion-free form, matching Equation (2).

$$x'(v) = \text{real}\{x(v) \cdot e^{i[2\pi\tau_S E_S v^2]}\} \qquad (15)$$

$$= \text{real}\{Ae^{i[2\pi\tau_S v+\tilde{\phi}]} \cdot e^{-i[2\pi\tau_S E_S v^2]} \cdot e^{i[2\pi\tau_S E_S v^2]}\}$$

$$= \text{real}\{Ae^{i[2\pi\tau_S v+\tilde{\phi}]}\}$$

$$= A\cos(2\pi\bar{\tau}_S v + \tilde{\phi})$$

However, for reflectors at different locations along the fiber, the effects of GVD have been altered, but not eliminated. Consider a reflector at a delay $\bar{\tau}_s' \neq \bar{\tau}_s$. Here Equation (15) becomes $$x'(v) = \text{real}\{x'(v) \cdot e^{i[2\pi\tau_S E_S v^2]}\} \qquad (16)$$

$$= \text{real}\{Ae^{i[2\pi\tau' S v+\tilde{\phi}]} \cdot e^{-i[2\pi\tau' S E_S v^2]} \cdot e^{i[2\pi\tau_S E_S v^2]}\}$$

$$= \text{real}\{Ae^{i[2\pi\tau' S v+\tilde{\phi}]} \cdot e^{-i[2\pi(\tau' S - \tau_S)E_S v^2]}\}$$

Figure 4:
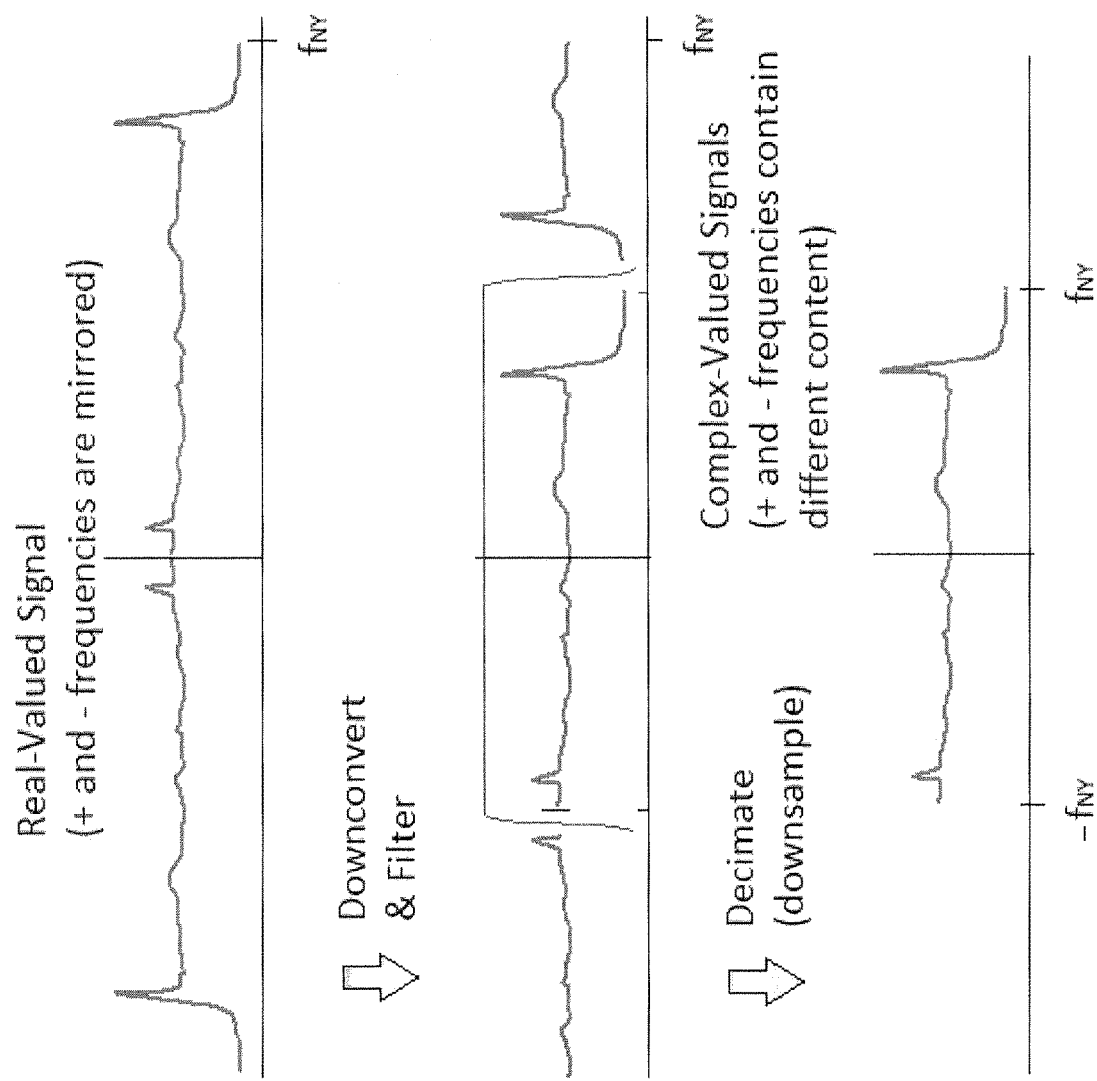
FIG. 4 is a conceptual diagram of down conversion, filtering, and decimation processes which can be used to generate complex valued data from a real valued signal.

Example implementations of static dispersion correction may be implemented for example during data processing steps in one or more programmed computers, firmware, and/or hardware. In this example, a complex-valued set of sensor interferometric data is generated by firmware down-conversion, filtering, and decimation as shown in FIG. 4. The phase of the complex-valued signal is then altered by multiplying the signal (in the v domain) by a complex perturbation function. This function has unity magnitude and a quadratic varying phase following the expression in Equation (14). The variable a is defined to denote the experimentally-derived coefficient of static dispersion correction.

Figure 5:
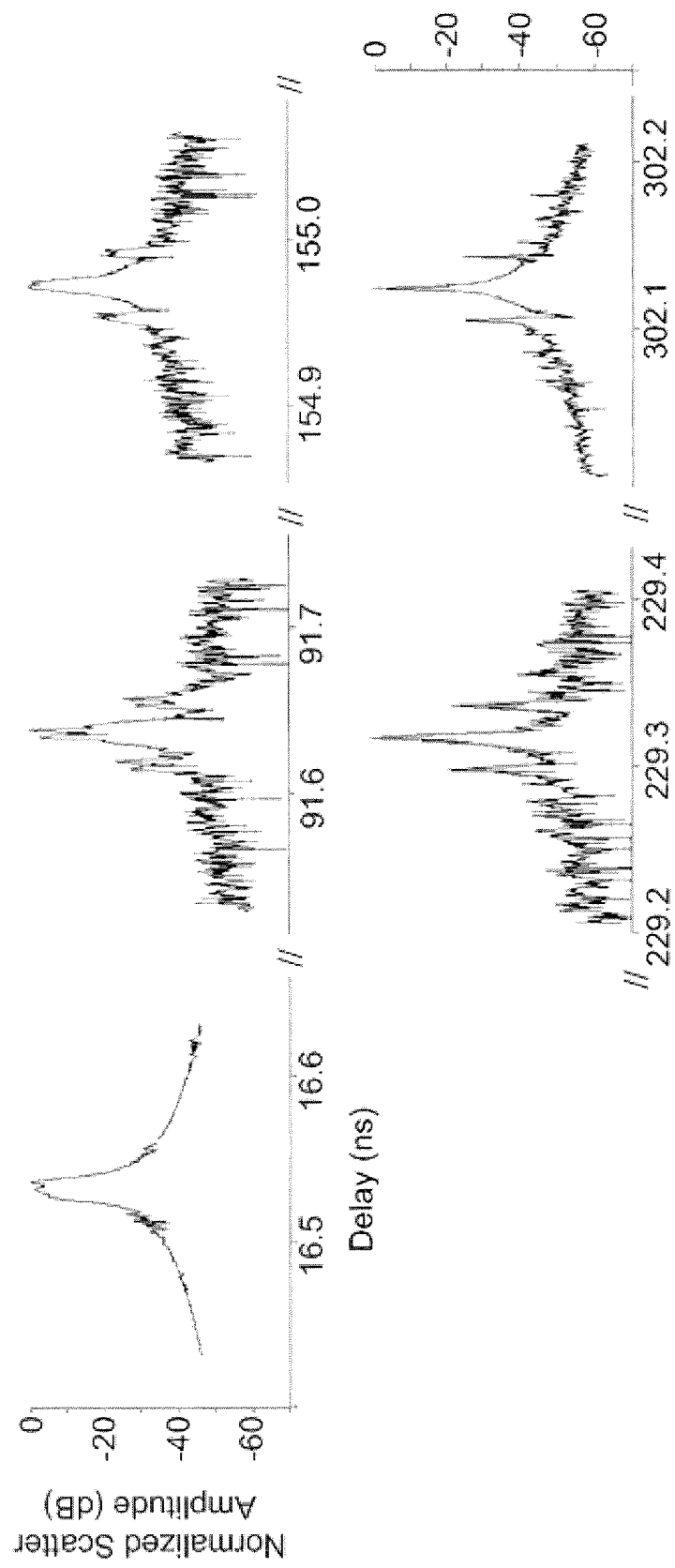
FIG. 5 shows a series of example graphs of OFDR-detected scatter amplitude for five different optical sensing fiber lengths with cleaved ends but with a static dispersion correction at a fiber location corresponding to the delay of 302 ns.
Figure 6:
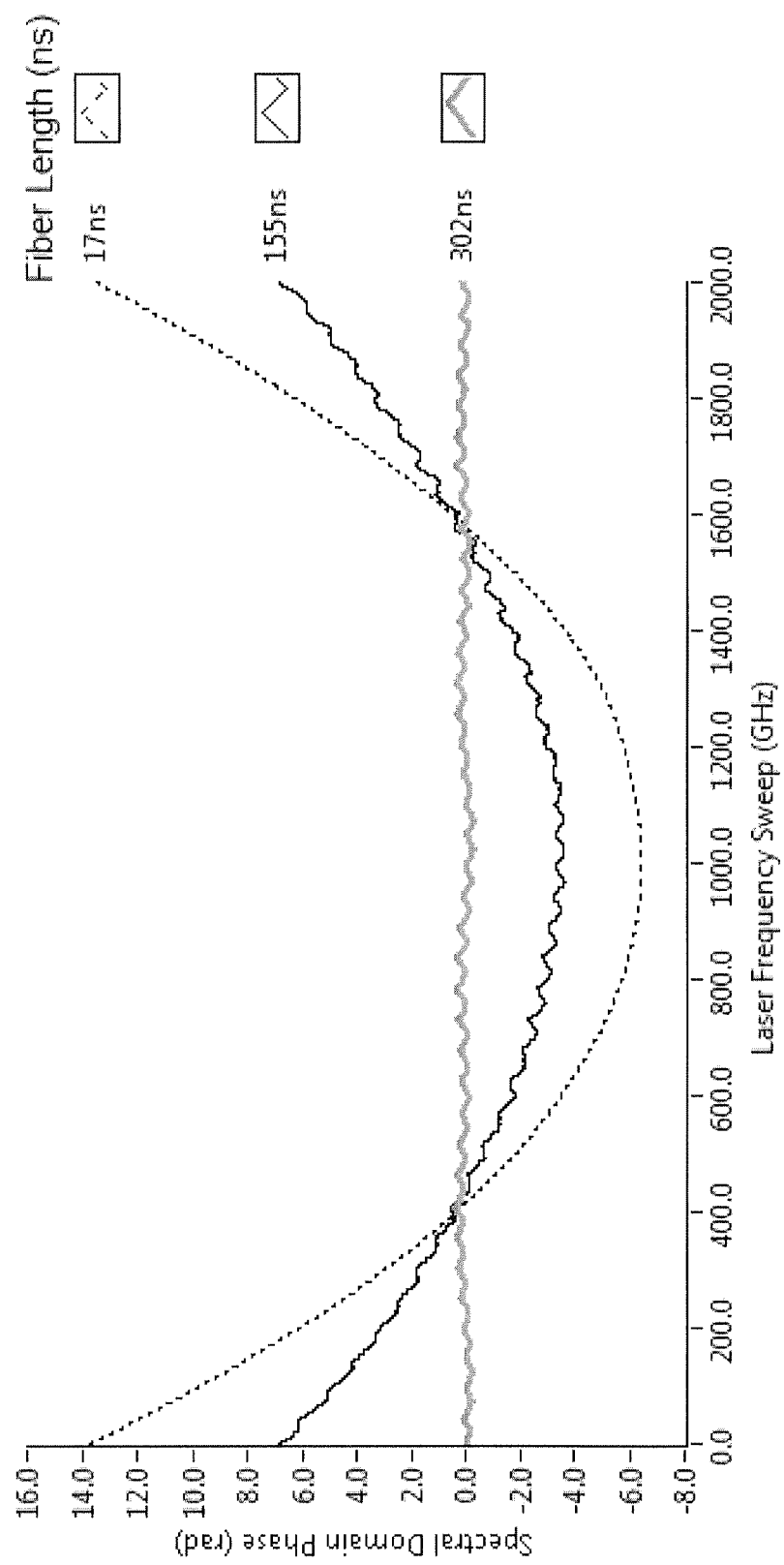
FIG. 6 shows a spectral domain phase for three of the five locations with the static correction in FIG. 5.

The further a reflector location is from the region of interest, the larger the uncorrected effect of dispersion. These observations are confirmed in FIGS. 5 and 6, which illustrate data from the same five cleaved-end fiber samples described in the previous section. In this data set, static dispersion correction was applied by multiplying the complex spectral-domain data with a optical dispersion offset as described in Equation (14). The adjustment a has been tuned to correct for the effects of GVD in the longest sample (total delay of 302 ns). The static correction narrows the delay domain peak and flattens the spectral domain phase response of the 302 ns cleaved end. However, it has the opposite effect on the peaks at shorter lengths, producing a broad peak and quadratic phase response at 16.5 ns.

Resampling of the OFDR Sensing Signal to Generate a Continuous Dispersion Correction.

In order to correct for the effects of GVD along the length of the sensing signal, the data must be re-sampled in such a way that the total phase from a discrete reflector $\Phi_s$ increases linearly vs. a new independent variable y(v). From Equation (12), y(v) is defined below.

$$2\pi\bar{\tau}_s(1-E_s v)v = 2\pi\bar{\tau}_s \cdot y(v)$$

$$y(v)=v-E_s v^2 \quad (17)$$

Effect of Group Velocity Dispersion in OFDR Monitor Signal and Linearization.

The sensing fiber is not the only element in the system that experiences GVD; the fiber that forms the laser monitor interferometer may also exhibit a nonzero dispersion value. This GVD value, represented by coefficients $D_m$ and $E_m$, may be the same or different from that of the sensing fiber. The dispersive properties of the monitor fiber affect the signal by altering the input to the OFDR linearization and resampling system. The above analysis can be applied to the monitor interferometer delay $\tau_m$ in the same way it was applied to the sensing interferometer.

$$\tau_m(v)=\bar{\tau}_m[1-E_m \cdot (v-\bar{v})] \quad (18)$$

The linearization process works by resampling the OFDR data such that the apparent instantaneous frequency of the interference signal at the monitor detector is always held constant. In the absence of GVD, this process ensures that each linearized sample is collected at an even interval of laser frequency v. In the presence of monitor GVD, the linearization re-samples the OFDR data according to the following expression, where $\Phi_m$ represents the total time-varying phase of the monitor interferometer and z(v) is the resulting resampling function.

$$\Phi_m(v)=2\pi\bar{\tau}_m(1-E_m v)v \equiv 2\pi\bar{\tau}_m z(v)$$

$$z(v)=v-E_m v^2 \quad (19)$$

The preceding analysis concluded that in order to eliminate the effect of GVD in the OFDR sensor signal, the data should be re-sampled with function y(v). Alternatively, using its internal monitor interferometer, the OFDR may resample the data with function z(v). In an example application, the OFDR system has no direct knowledge of laser frequency v(t) and must rely on a flawed monitor measurement. Therefore, in an example implementation, a continuous dispersion correction algorithm seeks to modify the resampling function z(v) such that it is transformed into the desired resampling function y(v). This is mathematically represented by the correction function g(v).

$$z(g(v))=y(v)$$

$$g(v)-E_m g^2(v)=v-E_s v^2 \quad (20)$$

In a typical example optical fiber, the dispersion coefficient is expected to be small. Therefore, the square of the dispersion correction function can be approximated as follows:

$$g^2(v) \approx v^2$$

$$g(v) \cong v-(E_m-E_s)v^2 \quad (21)$$

The result in Equation (21) illustrates a dispersion relationship in a monitor-linearized OFDR system. In such a system, the OFDR sensing signal is affected by the difference in the dispersion between the sensing fiber and the optical fiber that makes up the monitor interferometer. If the two fibers are perfectly matched ($E_m=E_s$), no additional correction is required beyond the conventional laser scan linearization. However, if the two fibers have different dispersion coefficients, the resampling that occurs during linearization is modified by a quadratic function g(v) to ensure that the OFDR data is coherent.

The resampling function g(v) is not dependent on fiber length/optical delay. This shows that the quadratic resampling of the OFDR sensor signal data provides a continuous correction for GVD along the entire length of the fiber. However, the GVD term in Equation (12) is scaled by the average optical sensor delay $\tau_s$; though the derived correction works equally well at short and at far distances along the fiber, it must correct for a GVD-induced error in the phase of the sensor signal that becomes more significant at longer lengths. This explains why the GVD correction is advantageous to performing high-fidelity OFDR sensing over long sensor lengths.

Figure 7:
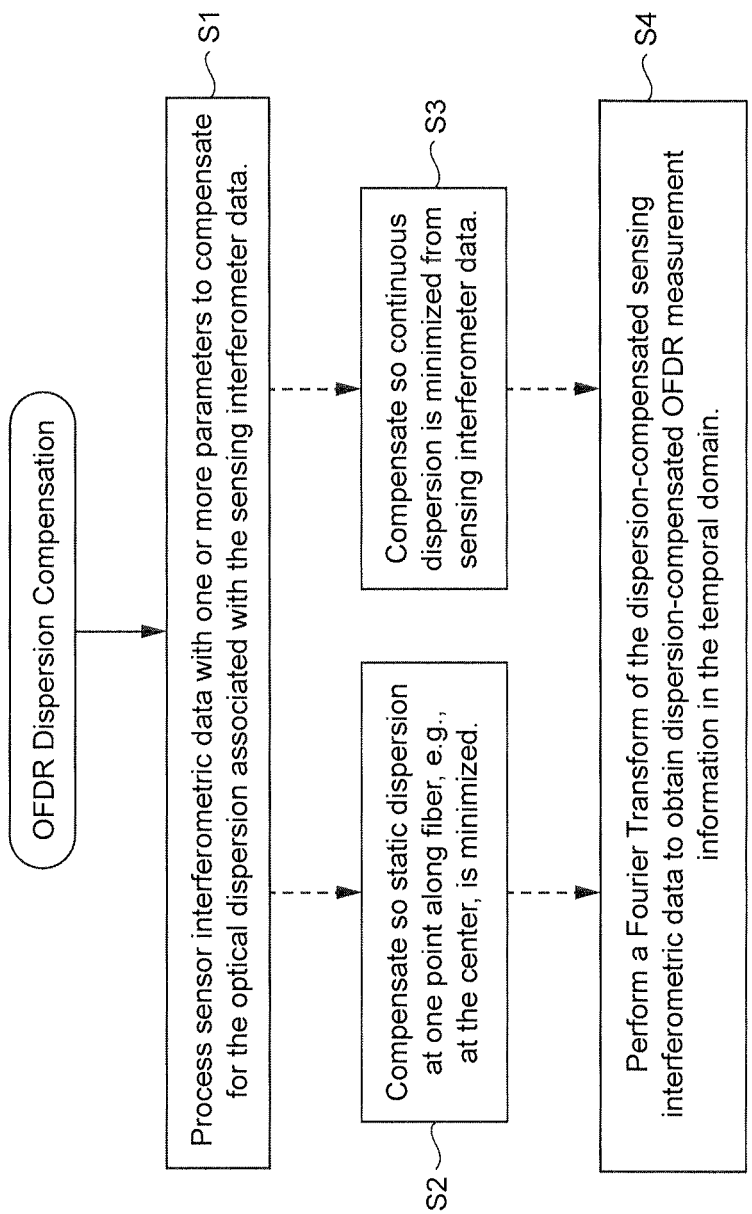
FIG. 7 is a flowchart diagram of procedures in accordance with an example embodiment for optical dispersion correction for OFDR measurement data.

FIG. 7 is a flowchart diagram of procedures in accordance with example embodiments for optical dispersion compensation for OFDR measurement data. Step S1 includes processing sensor interferometric data obtained by the OFDR measurement with one or more parameters to compensate for the optical dispersion associated with the sensing interferometer data. Step S2 is an optional embodiment (shown with dashed lines) that compensates to reduce or minimize static dispersion at one point along a fiber, e.g., at the center of the sensing fiber. Step S3 an optional embodiment (shown with dashed lines) that compensates to reduce or minimize for continuous dispersion along some portion or all of the sensing fiber. Step S4 includes performing a Fourier Transform of the dispersion-compensated sensing interferometric data in the spectral domain to provide dispersion-compensated OFDR measurement data in the temporal domain.

Figure 8:
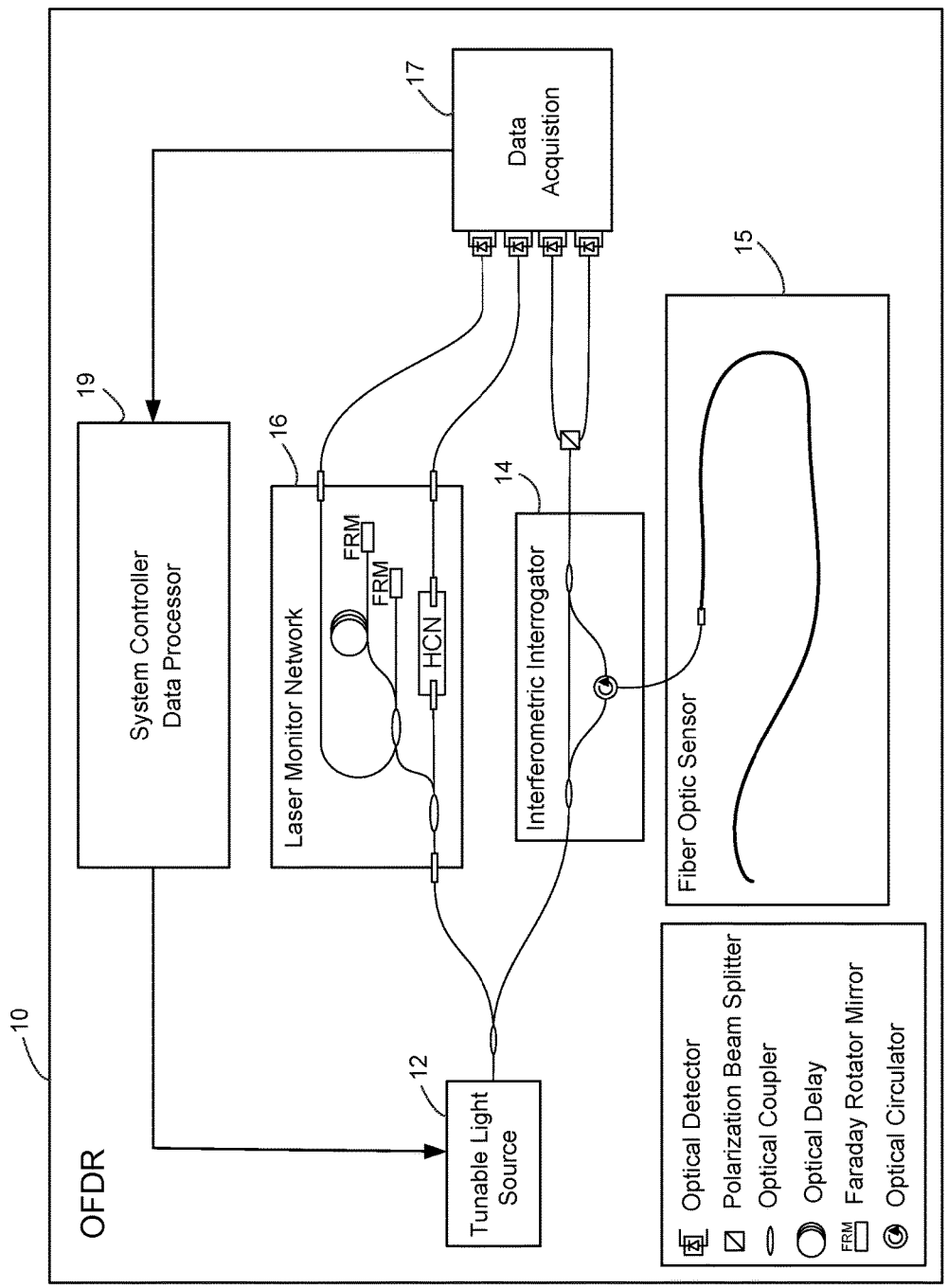
FIG. 8 is a function block diagram of an OFDR machine for implementing the example embodiment outlined in FIG. 7 for optical dispersion correction for OFDR measurements.

FIG. 8 is a function block diagram of an OFDR machine for implementing the example embodiment outlined in FIG. 7 for optical dispersion correction for OFDR measurements. Similar reference numbers used in FIG. 1 are used for like elements. During an OFDR measurement, a light source 12 is swept through a range of optical frequencies. This light is split with the use of optical couplers and routed to two separate interferometers 14, 16. The interferometric interrogator 14 is connected to a length of sensing fiber 15. Light enters the sensing fiber through the measurement arm of the interferometric interrogator 14. Scattered light from the sensing fiber 15 is then interfered with light that has traveled along the reference arm of the interferometric interrogator 14. The monitor interferometer 16 measures fluctuations in tuning rate as the light source 12 is scanned through a frequency range. The laser monitor network also contains a Hydrogen Cyanide gas cell HCN which is used to provide absolute wavelength reference throughout the measurement scan. A series of optical detectors convert the signals from the laser monitor network, gas cell, and the interference pattern from the sensing fiber to electrical signals. One or more data acquisition processors 17 use the information from the monitor interferometer 16 to resample the interference pattern of the sensing fiber 15 such that it possesses increments constant in optical frequency. This step is a mathematical requisite of the Fourier transform operation. Once resampled, a Fourier transform is performed by the system controller data processor 19 to produce a fiber scatter response in the temporal domain. The fiber scatter response is a complex valued signal. In the temporal domain, the amplitude of the complex scattering response depicts the amount of scattered light verses delay along the length of the fiber. Using the distance light travels in a given increment of time, this delay can be converted to a measure of length along the sensing fiber. In other words, the processed OFDR signal depicts each scattering event as a function of distance along the fiber. The phase of the complex scattering response depicts the accumulated optical phase of the scattered light. Change in length of the fiber can be measured by comparing the change in optical phase along the sensing fiber for a given OFDR measurement relative to a baseline OFDR measurement. The sampling period is referred to as spatial resolution and is inversely proportional to the frequency range that the tunable light source was swept through during the measurement.

Figure 9:
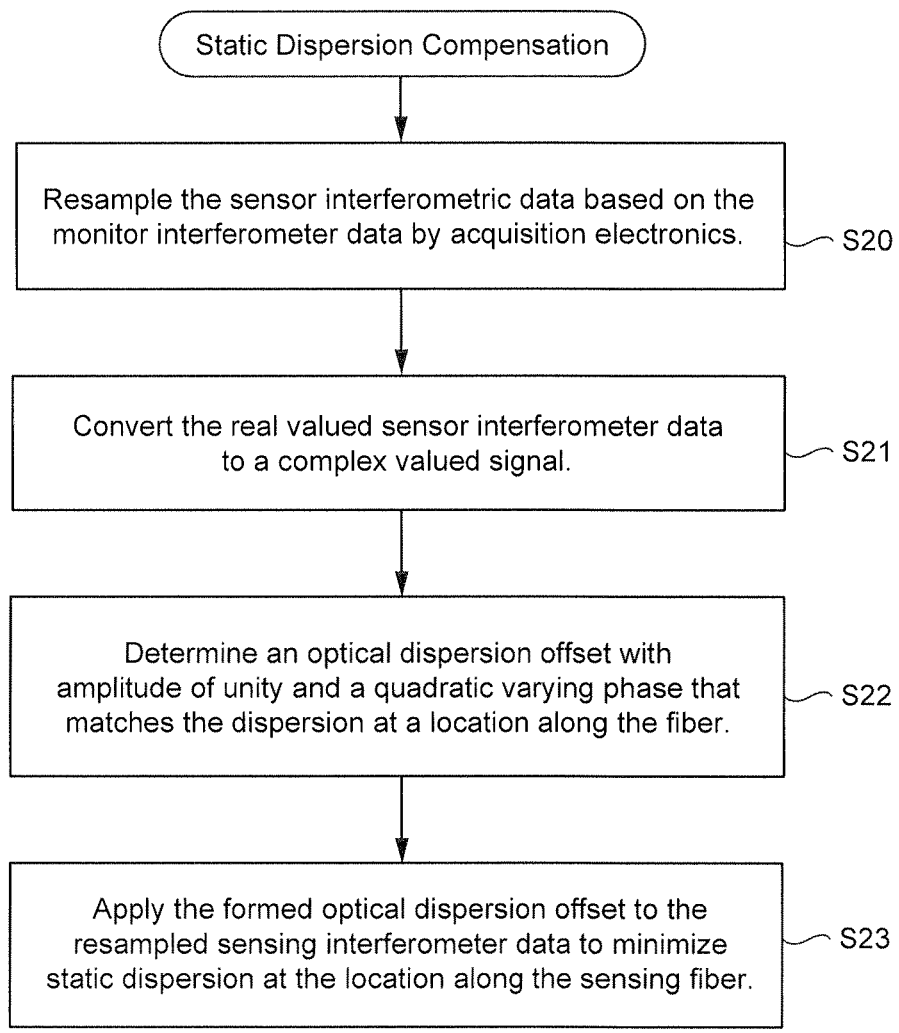
FIG. 9 shows a flowchart of a static dispersion correction algorithm that may be implemented in firmware, program software implemented by a computer, and/or hardware.

FIG. 9 shows a flowchart of a static dispersion correction algorithm that may be implemented in firmware, program software implemented by a computer, and/or hardware. The acquisition electronics 17 resamples the sensor interferometer data based on the monitor interferometer data to remove tuning speed variations from the tunable laser sweep which is a standard operation in an OFDR measurement (S20). The real valued resampled sensor interferometer data is converted to a complex numerical representation (S21). This can be achieved by several operations known to be performed to OFDR measurements such as down converting, filtering, and decimation or by assembling a complex number in which the real value is the resampled sensor interferometer data and the imaginary component is zero valued. An optical dispersion offset is formed with an amplitude of unity and a quadratic varying phase that minimizes the dispersion at a static location along the fiber. (S22). The formed optical dispersion offset is applied to the resampled system interferometer data to minimize static dispersion at a location along the sensing fiber (S23).

Figure 10:
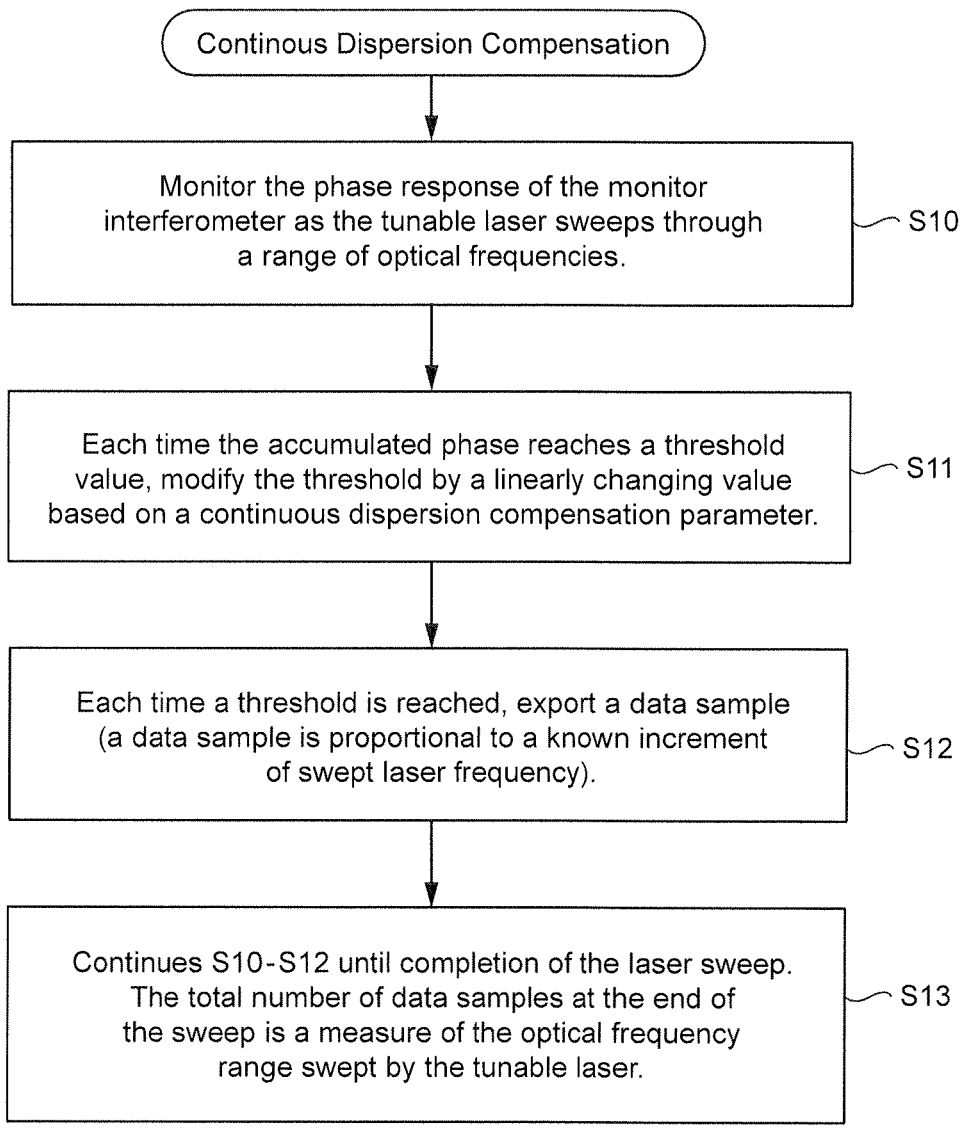
FIG. 10 shows a flowchart of a continuous dispersion correction algorithm that may be implemented in firmware, program software implemented by a computer, and/or hardware.

FIG. 10 shows a flowchart of a continuous dispersion correction algorithm that may be implemented in firmware, program software implemented by a computer, and/or hardware. As explained earlier, GVD is an optical phenomenon in which different optical frequencies travel at different rates through the fiber. The laser is swept through a range of optical frequencies at a given sweep rate. Therefore, if dispersion is present in the system, then the acquired optical frequencies at the beginning of an OFDR measurement acquisition travel at a different rate than the optical frequencies at the end of an OFDR measurement acquisition. In other words, if the dispersion in the monitor interferometer does not match the dispersion of the sensing interferometer, the frequency response of these interferometers may arrive at different times. To compensate for dispersion continuously along the sensing fiber or some portion thereof, the monitor interferometer data is processed so that the response at a given optical frequency is mapped to a time in the OFDR measurement acquisition that matches the sensor interferometer response. This can be achieved by linearly varying the optical frequency increment of the monitor interferometer response.

Returning now to FIG. 10, the acquisition electronics monitor the phase response of the monitor interferometer as a tunable laser sweeps through a range of optical frequencies (S10). Each time the accumulated phase of the measured OFDR signal reaches a threshold value, the threshold is modified by a linearly changing value based on a continuous dispersion compensation parameter (S11). In addition, each time the accumulated phase of the monitor interferometer reaches a threshold, a data sample is exported (S12). A data sample is proportional to a known increment of swept laser frequency. This process continues until completion of the laser sweep. The total number of exported data samples at the end of the sweep is an indicator of the optical frequency range swept by the tunable laser (S13).

Continuous correction for GVD mismatch between the sensing and monitor interferometer fibers can be accomplished in several ways. Non-limiting examples include physically chirping the frequency scan of the laser, altering the linearization resampling process, or interpolating and resampling the linearized OFDR data. The linearization adjusted for GVD can be implemented via hardware-triggered acquisition, firmware interpolation and resampling, or software interpolation or resampling.

Figure 11:
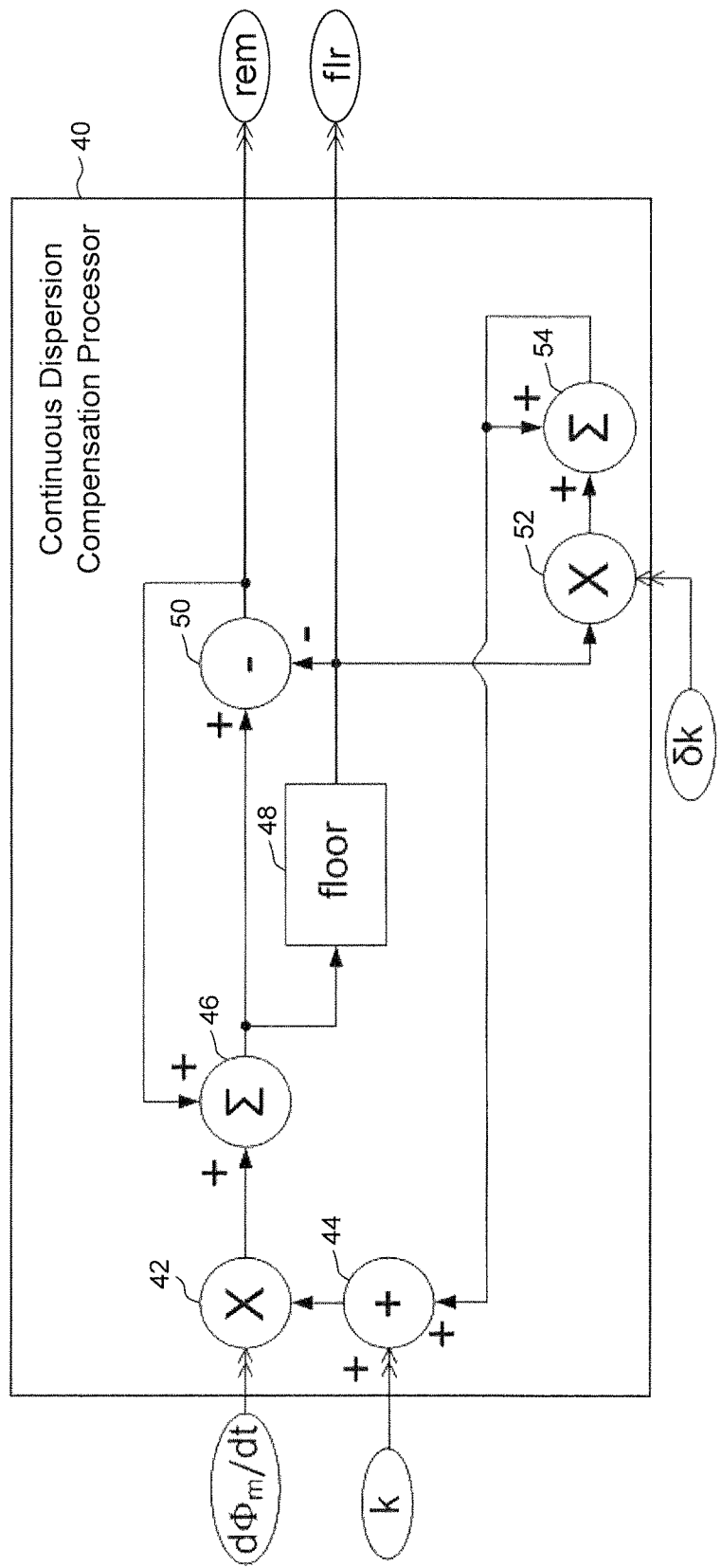
FIG. 11 is a diagram of an example continuous dispersion compensation processor that processes a monitor interferometer response to output data samples at a variable optical frequency spacing to compensate for accumulated optical dispersion along the sensing fiber.

FIG. 11 shows a block diagram of an example embodiment of reprocessing the monitor interferometer signal to provide a continuous correction for GVD mismatch. A continuous dispersion compensation processor 40 implemented in the acquisition processing electronics receives a monitor phase derivative $k \cdot (d\Phi_m/dt)$ input from the monitor interferometer signal as the tunable laser is swept through a range of optical frequencies. The scaling factor k is used to control the size of the optical frequency increment of the output data samples. This k value is incremented 44 throughout the acquisition of the monitor interferometer data and multiplied 42 by the monitor phase derivative to produce a scaled monitor phase derivative. This scaling factor k is adjusted throughout an acquisition which causes the size of the optical frequency increment to change throughout the acquisition. This change in optical frequency increment size throughout the acquisition is the mechanism that continuously compensates for optical dispersion along the sensing fiber. During the acquisition of the monitor interferometer data, a feedback loop formed from an integration processor block 46 of the scaled monitor phase derivate, from a comparator processor block 48 that compares the integrated scaled monitor phase derivative to a threshold value, and a differencing processing block 50. This feedback loop 46, 48, 50 is used to integrate the scaled monitor phase derivative, producing a scaled measurement of total monitor interferometer phase up to that point in time during the sweep of the tunable laser. This scaled monitor interferometer phase is compared 48 against a threshold "floor" value, and each time the accumulated scaled monitor interferometer phase reaches a threshold value, the acquisition electronics directs the linearization algorithm to output a data sample (flr output). The differencing processing block 50 subtracts the threshold amount of accumulated monitor phase from the accumulated monitor phase to prevent numbers from becoming too large in the integration of the scaled monitor phase derivative 46 completing the feedback loop. Because the monitor phase $\Phi_m$ is proportional to the actual laser frequency, this dispersion correction algorithm indicates the points at which the laser's frequency has changed by a certain increment $\delta v$. Changing the value of the scaling factor k changes the frequency increment at which output samples are produced. Continuous dispersion correction can be achieved by adding a small offset $\delta k$ each time a output data sample is produced 52 throughout an acquisition. This offset $\delta k$, which can be either positive or negative, changes the effective value of $\Phi_m$ required to generate a data sample output. This accumulated offset 52, 54 is used to modify the scaling factor k 44 which controls the size of the optical frequency increment. In other words, modifying the scaling factor k by an accumulated small offset $\delta k$ each time a data sample is output slightly changes the increment of laser frequency between two adjacent linearized output samples. Because $\delta k$ is incremented each time the processing electronics produces an output sample, the frequency increment $\delta v$ gets linearly larger or smaller as the acquisition progresses, i.e., "frequency chirping" occurs. Linearly chirping Ωv/dt produces the same kind of quadratic resampling in v required to compensate for GVD mismatch between the sensor and monitor fibers.

Figure 12:
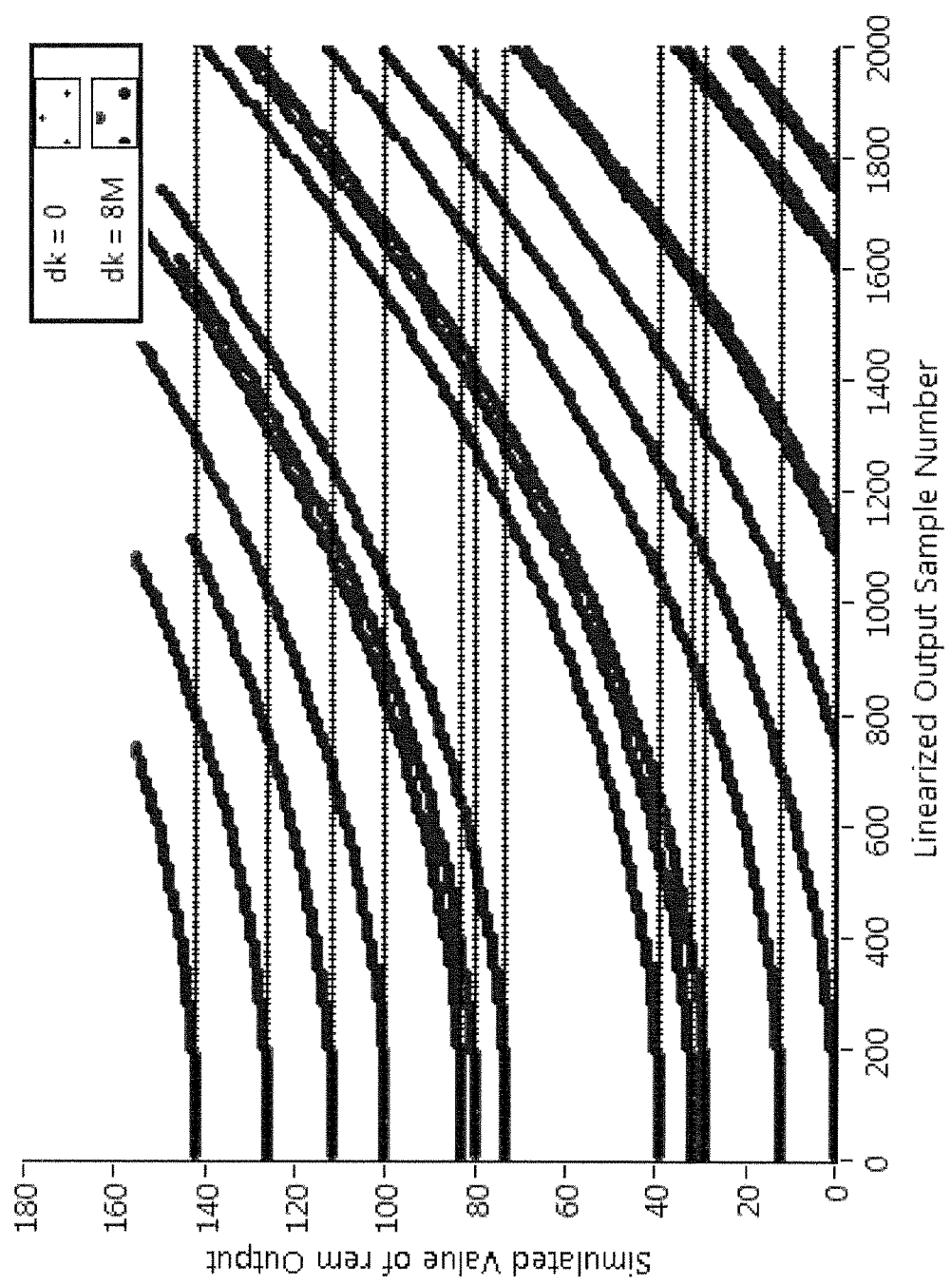
FIG. 12 shows a simulation for the continuous dispersion compensation processor shown in FIG. 11 with and without GVD correction.

The operation of this example continuous dispersion compensation processor 40 is illustrated by the simulated data in FIG. 12. In this simulation, a constant value of $d\Phi_m/dt$ is input into the continuous dispersion compensation processor. This is equivalent to the condition in which the laser's scan is perfectly linear in frequency, resulting in a linearly increasing monitor phase. When the GVD offset coefficient δk is set to zero, the remainder output of the continuous dispersion compensation processor displays a quantized behavior The continuous dispersion compensation processor outputs a data sample at fixed intervals, which repeat throughout the time duration of the scan. When δk is set to a large value, the remainder output displays a quadratic chirp. This indicates that the GVD compensation is changing the interval at which the acquisition electronics signal a data sample output causing the optical frequency increment between consecutive data samples to vary throughout the OFDR acquisition.

Figure 13:
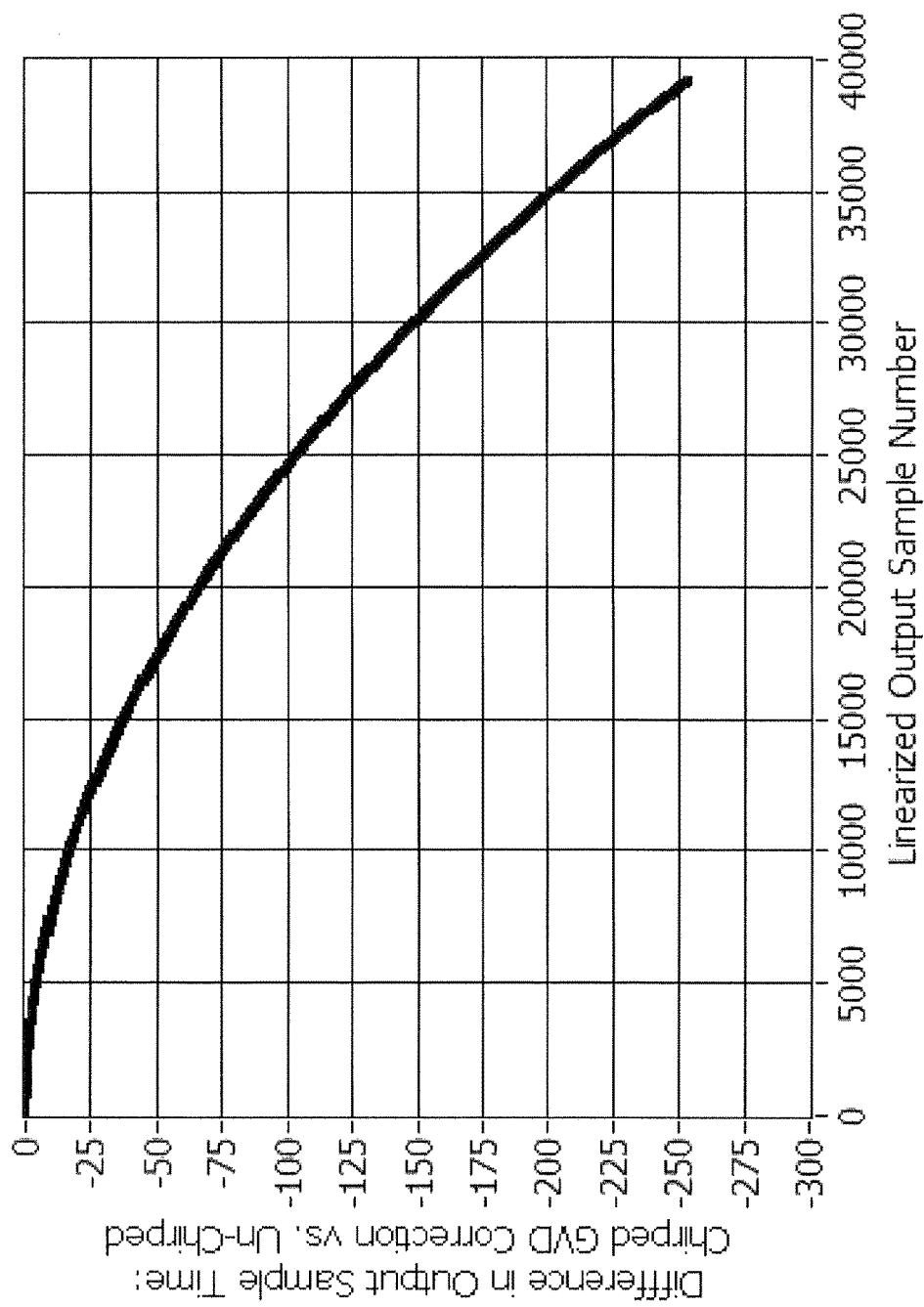
FIG. 13 is a graph of simulation of the continuous dispersion compensation processor with GVD correction showing that the integrated time it takes the laser to sweep through a range of linearly changing optical frequency increments varies quadratically.

FIG. 13 presents a view of the simulated flr output which corresponds to the output data samples produced when the monitor interferometer phase reaches a threshold value throughout an acquisition. There are two successive time-domain simulations: one with δk=0 and the other with a large value of δk. During each simulation, the time is noted whenever the acquisition electronics indicated an output sample. These times are subtracted to generate a comparison between the two simulations. The time between generation of output samples decreases significantly over the course of the scan for the large-δk simulation relative to the zero-δk simulation. These simulations confirm that the example continuous dispersion compensation processor 40 shown in FIG. 1 produces the quadratic resampling of the data for continuous GVD correction. If the frequency increment between consecutive data samples throughout an acquisition is varying linearly due to the input value of δk, then the integrated time it takes the laser to sweep through a linearly increasing optical frequency increment will be a quadratic response.

Figure 14:
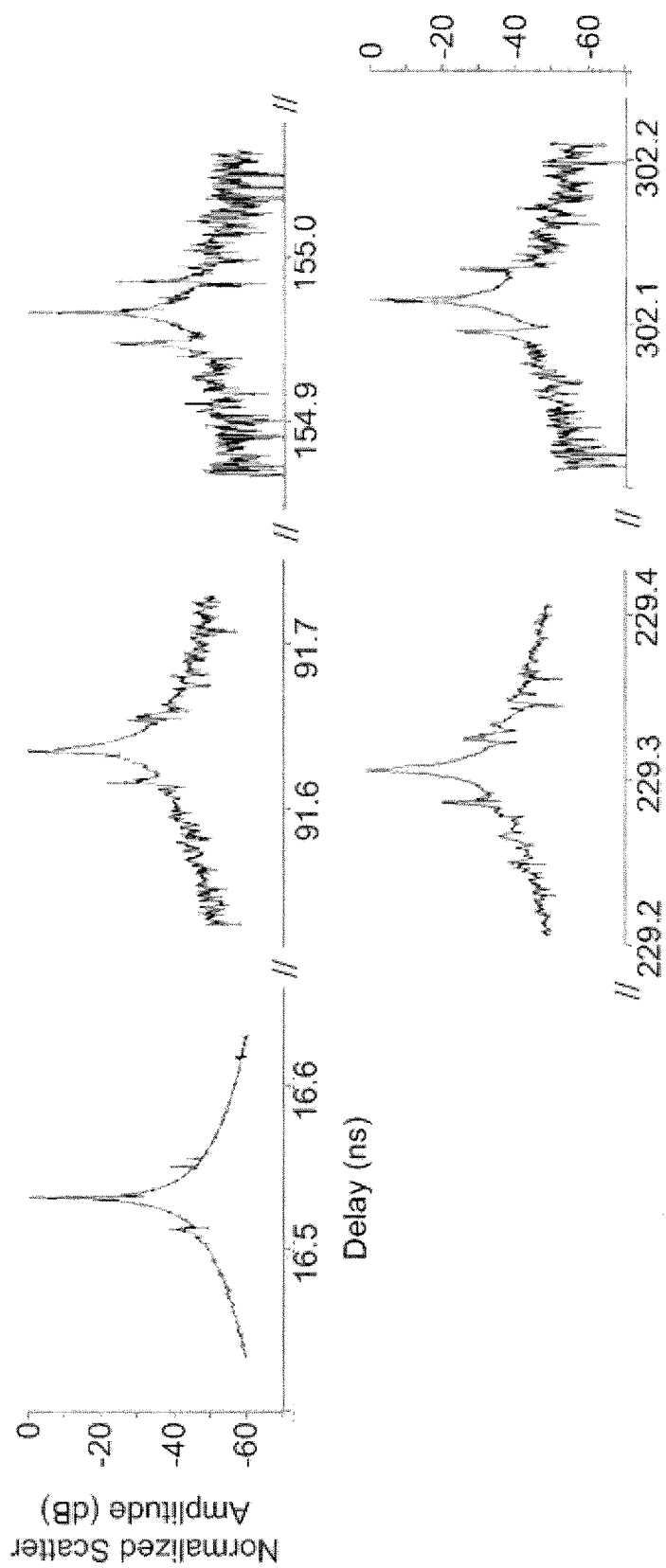
FIG. 14 shows a series of example graphs of OFDR-detected scatter amplitude for five different optical sensing fiber lengths with cleaved ends implementing an example embodiment of continuous dispersion correction.
Figure 15:
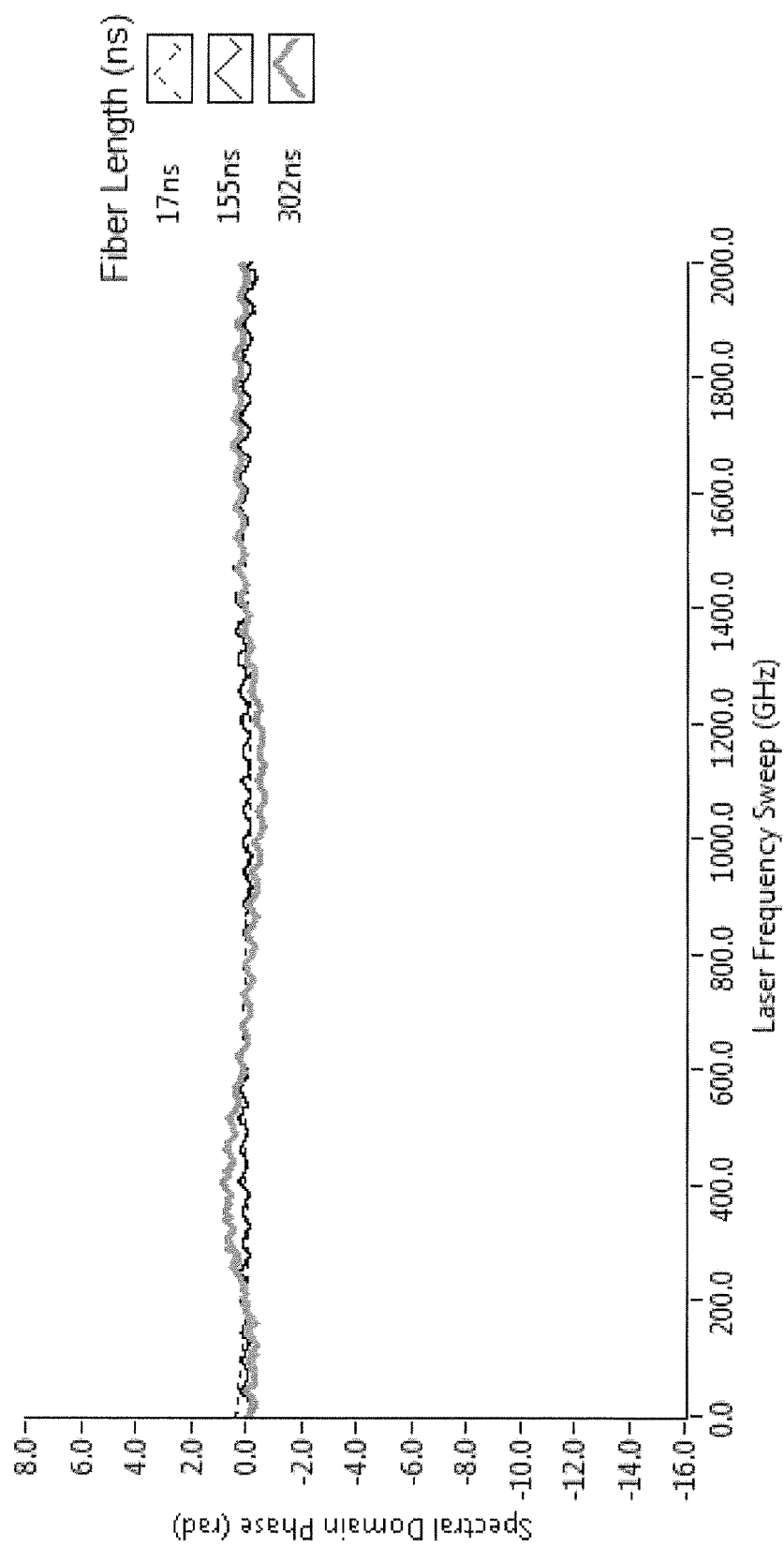
FIG. 15 shows a spectral domain phase for three of the five locations in FIG. 14.

FIG. 14 shows a series of example graphs of OFDR-detected scatter amplitude for five different locations along a sensing fiber implementing an example embodiment of continuous dispersion correction, and FIG. 15 shows a spectral domain phase for three of the five locations in FIG. 14. For these Figures, OFDR measurements of the five cleaved-end fibers used in prior tests shown for FIGS. 2 and 3 were re-collected using the chirped sampling acquisition electronics. The level of chirp was adjusted to optimize signal quality at the 302 ns reflector. The resulting delay-domain data, shown in FIG. 14, exhibits narrow peaks at each of the five delay lengths tested. The quadratic phase response is also eliminated at each peak as shown for three of the delays in FIG. 15.

Figure 16:
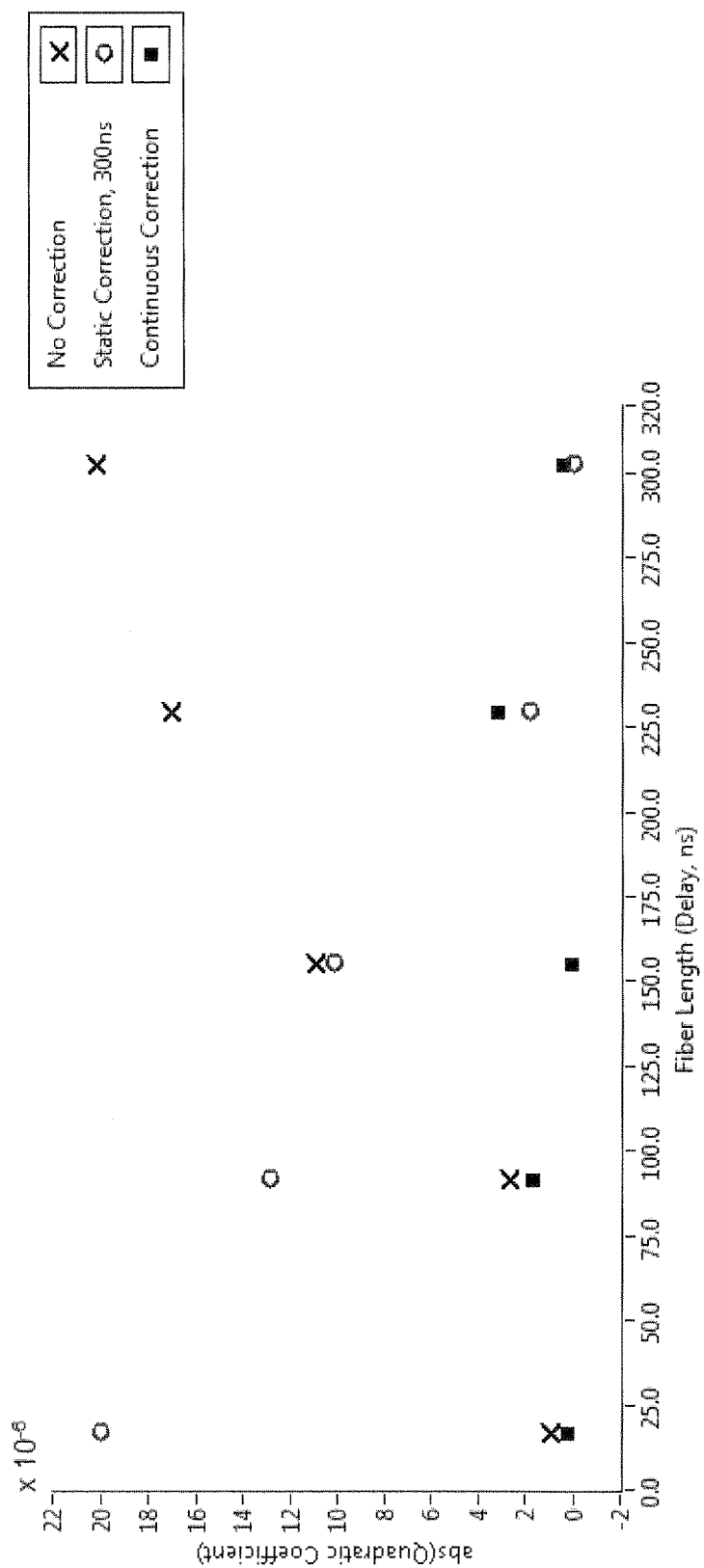
FIG. 16 illustrates a comparison of spectral domain phase response for cleaved fiber ends processed without dispersion correction, with static dispersion correction, and with continuous dispersion correction.

FIG. 16 summarizes the magnitude of the quadratic spectral domain phase responses obtained via quadratic fit of the data in each of the three non-limiting example experiments. The magnitude of the quadratic response indicates the level of dispersion mismatch in the OFDR signal. Without GVD correction, the spectral phase becomes more highly quadratic with increasing delay. With static GVD correction, tuned to the longest length, the data displays the opposite response. Continuous GVD correction reduces the magnitude of the quadratic term across the entire delay range tested.

In one example implementation, a small mismatch in GVD between the sensing and monitor fibers may make it difficult to analytically calculate the correct values of static and continuous correction coefficients. In this implementation, the values of the continuous and static GVD correction constants δk and α are thus empirically determined for a given sensing fiber on a given OFDR system. This can be achieved by changing the values of δk and α while scanning a long optical fiber with a cleaved end, splice, or other sharp reflection. The correct values of δk and α produce the sharpest possible peak in the FFT plot, and the flattest phase response in the spectral domain plot of the OFDR data.

Figure 17:
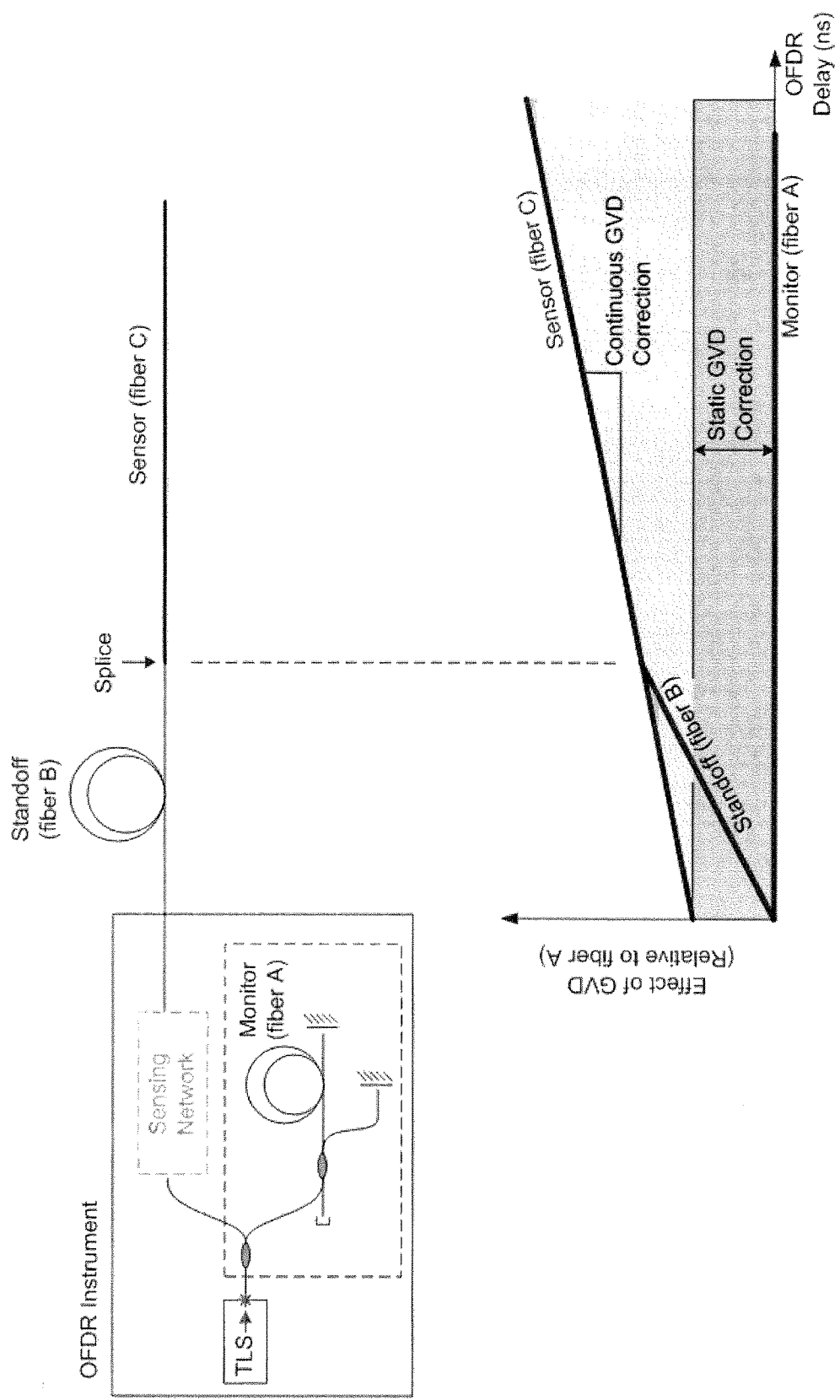
FIG. 17 illustrates combined use of static and continuous GVD correction to address different levels of dispersion mismatch among different sections of a fiber link (presented as normalized slopes relative to the dispersion of the monitor fiber (fiber A))

For some applications, it is desirable to apply both a static correction and a continuous dispersion correction. FIG. 17 illustrates an example of combined use of static and continuous GVD correction to address different levels of GVD mismatch among different sections of a fiber link. The effects of GVD are presented as normalized slopes relative to the dispersion of the monitor fiber (fiber A). OFDR optical networks may contain three or more different types of fiber, each with its own dispersion properties. The sensing fiber may be a custom, single-purpose fiber, chosen to facilitate a particular set of sensing constraints. The fiber used in the monitor interferometer may be a standard fiber, chosen to cost-effectively achieve a close match to the optical properties of the sensing fiber. The remaining optical network, including a potentially long stand-off fiber leading to the sensor, is often a different off-the-shelf standard fiber. Combining these different fibers into one system results in a significant accumulation of dispersion at the start of the sensing fiber, followed by a slowly growing dispersion (due to slight mismatch in the custom sensing fiber and the fiber in the monitor interferometer) down the length of the sensor. In this case, it is necessary to use both a static and a continuous dispersion correction. The static dispersion correction is used to correct for dispersion leading up to the sensing fiber by choosing the front of the sensing fiber as the region of interest. The continuous dispersion correction is then used to eliminate the accumulation of dispersion along the length of the sensing fiber.

Application of GVD to OFDR Phase and Delay Measurements.

Figure 18:
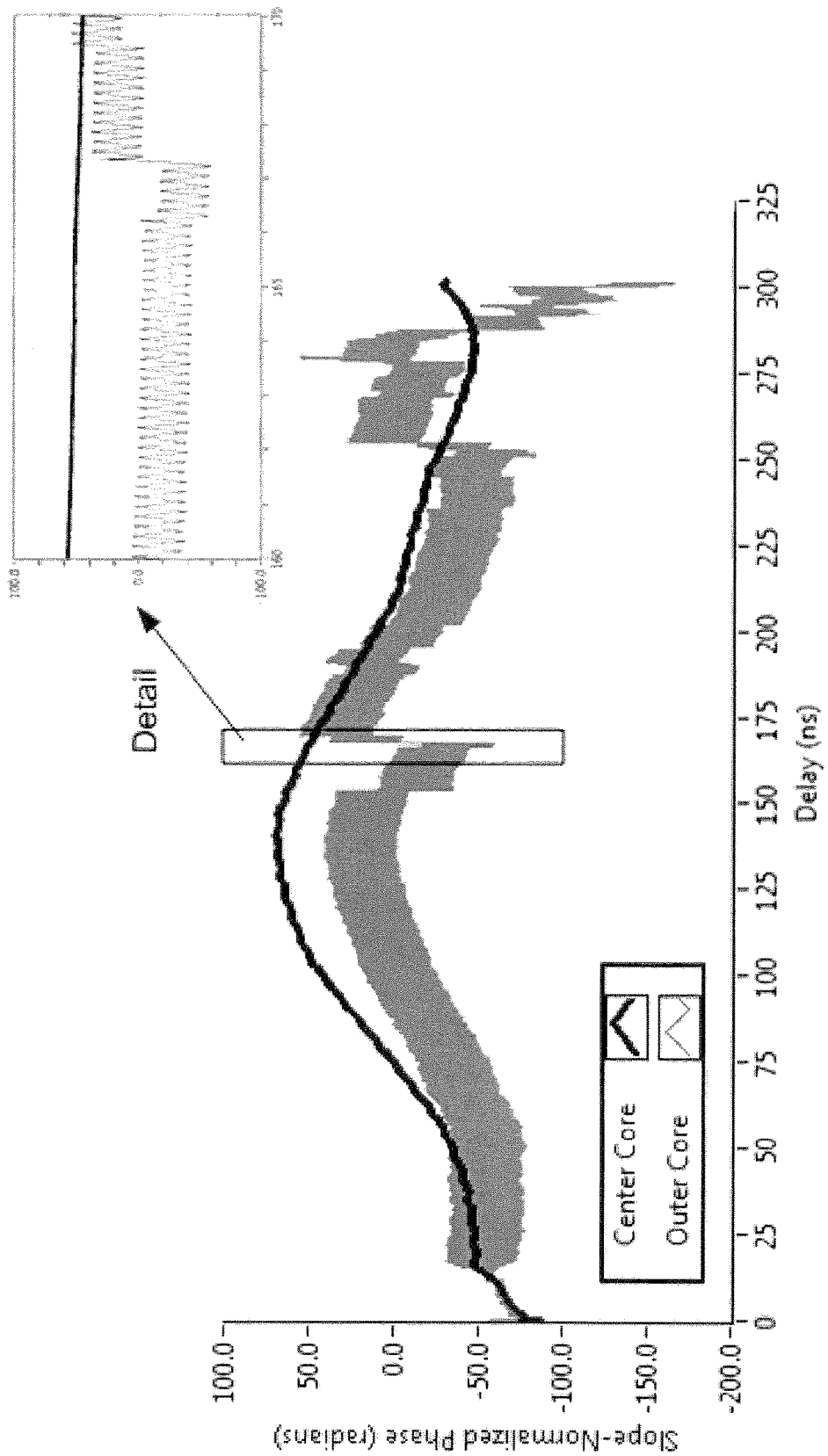
FIG. 18 is a graph of a phase signal from a tightly coiled shape sensing fiber, processed without continuous dispersion correction.
Figure 19:
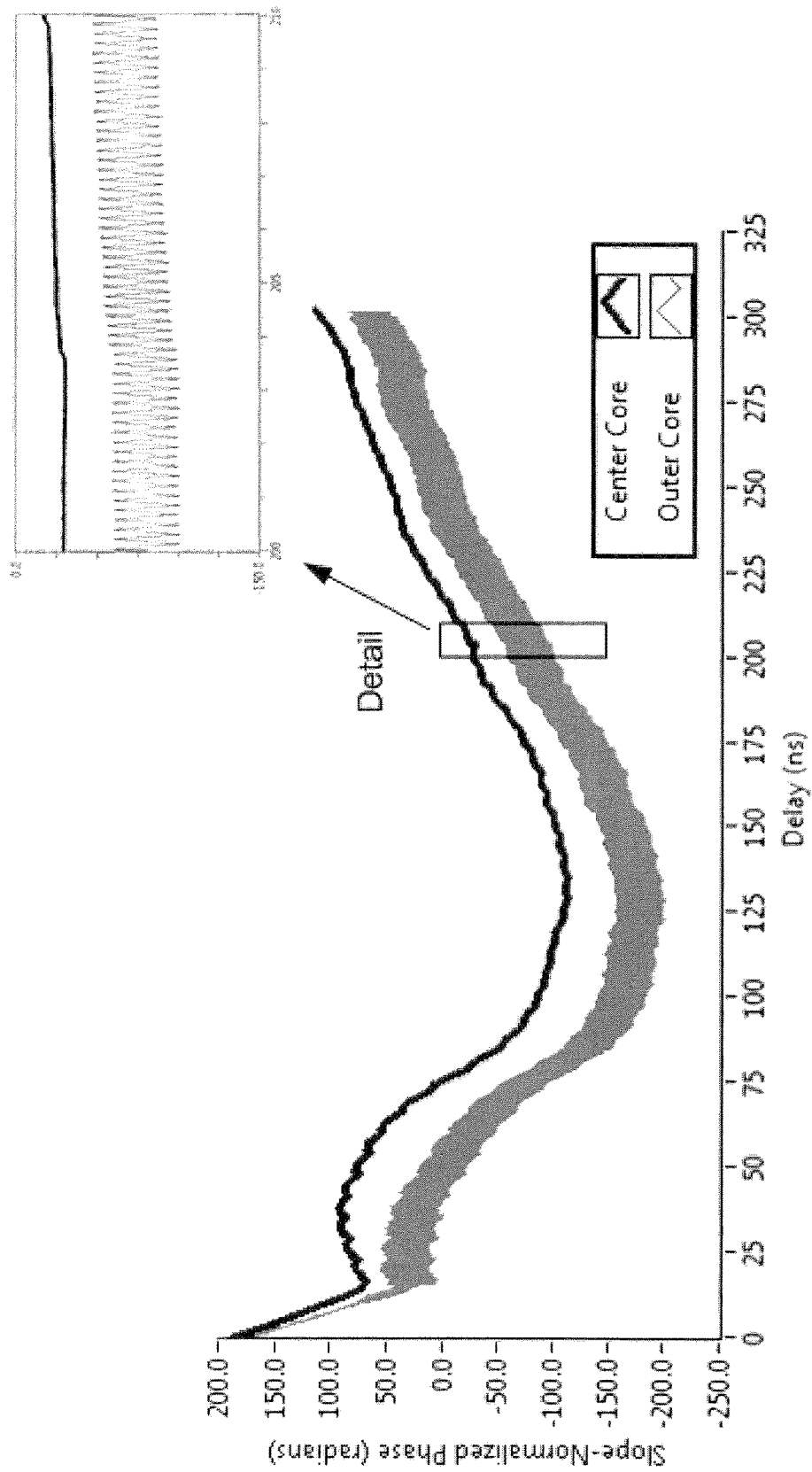
FIG. 19 is a graph of a phase signal from a tightly coiled shape sensing fiber, processed with continuous dispersion correction.

GVD correction improves the coherence of the data along the length of the fiber to enable robust measurement of distributed temperature, strain, 3D shape, and/or other parameters. This effect is illustrated in example fiber optic shape sensing measurements shown in FIGS. 18-19. A 30 m length of multi-core shape sensing optical fiber was placed in a 100 mm radius coil and scanned using the above-described OFDR technology. Two scans were performed: one without GVD correction and one with continuous GVD correction applied. Straight-fiber reference scans were also collected with and without GVD correction.

The 100 mm radius bend generates a large, constant-amplitude oscillating strain signal in the outer cores of the fiber. This strain signal was calculated using a continuous phase tracking algorithm, which measures the difference in sensing signal phase $\Phi_s$ between the bent fiber and a reference data set obtained on a straight (unstrained) fiber. See, e.g., D. K. Gifford, M. E. Froggatt, and S. T. Kreger, "High precision, high sensitivity distributed displacement and temperature measurements using OFDR-based phase tracking," presented at the 21st International Conference on Optical Fiber Sensors, Ottawa, Canada, 2011, vol. 7753, p. 775331, the contents of which are incorporated herein by reference. The measured strain is proportional to the derivative of the plotted phase difference $\Delta\Phi(\tau)$.

When the continuous dispersion correction firmware is disabled, the phase tracking algorithm cannot reliably measure the complex strain signal along the entire length of the outer cores. Dispersion causes a broadening of the OFDR response. Strain calculations can be made by cross correlating the amplitude response of a measurement scan to a baseline scan of the fiber. If dispersion has caused a broadening of the response, these correlations are more difficult to perform. Phase tracking operates on the complex measurement and baseline scan to achieve sub data index (unit of spatial resolution) resolution on changes in length. In other words, if a reflective event has been broadened, there is not a single shift that can be applied to the measurement to realign the data to the baseline data. Coherence refers to how well a measurement and baseline scan of the fiber are correlated in delay along the length of the fiber. Thus, if dispersion is present, coherence will decrease. This is evident from FIG. 18 which shows that a loss of coherence causes the phase tracking algorithm to break down, producing spurious discontinuities in the outer core phase signal. The mismatch in GVD between the sensing fiber and the monitor fiber causes a reduction in coherence in the Rayleigh scatter data. This reduced coherence reduces the signal-to-noise ratio (SNR) at the input of the phase tracking algorithm, making it more difficult to handle high frequency strain events. After 150 ns (15 m) along the fiber, the tracking algorithm loses the ability to make a valid measurement and begins to exhibit spurious jumps in the outer core signal.

With a suitable value for the dispersion correction parameter δk, the coherence of the Rayleigh scatter signal is significantly improved along the entire length of the fiber. This improves the raw OFDR data's signal to noise ration (SNR) and allows the phase tracking algorithm to make the challenging outer-core strain measurement more reliably. The results in FIG. 19 which shows that GVD correction allows the OFDR system to measure complex strain in tight bends along the entire 30 m length of fiber, in this non-limiting example. The phase measurement algorithm may also be used to calculate differential delay along the length of each sensing core [8]. This differential delay signal represents the relative delay between the measurement scan and the fiber's OFDR reference data. Under strain, the differential delay increases in response to the fiber's change in length.

Figure 20:
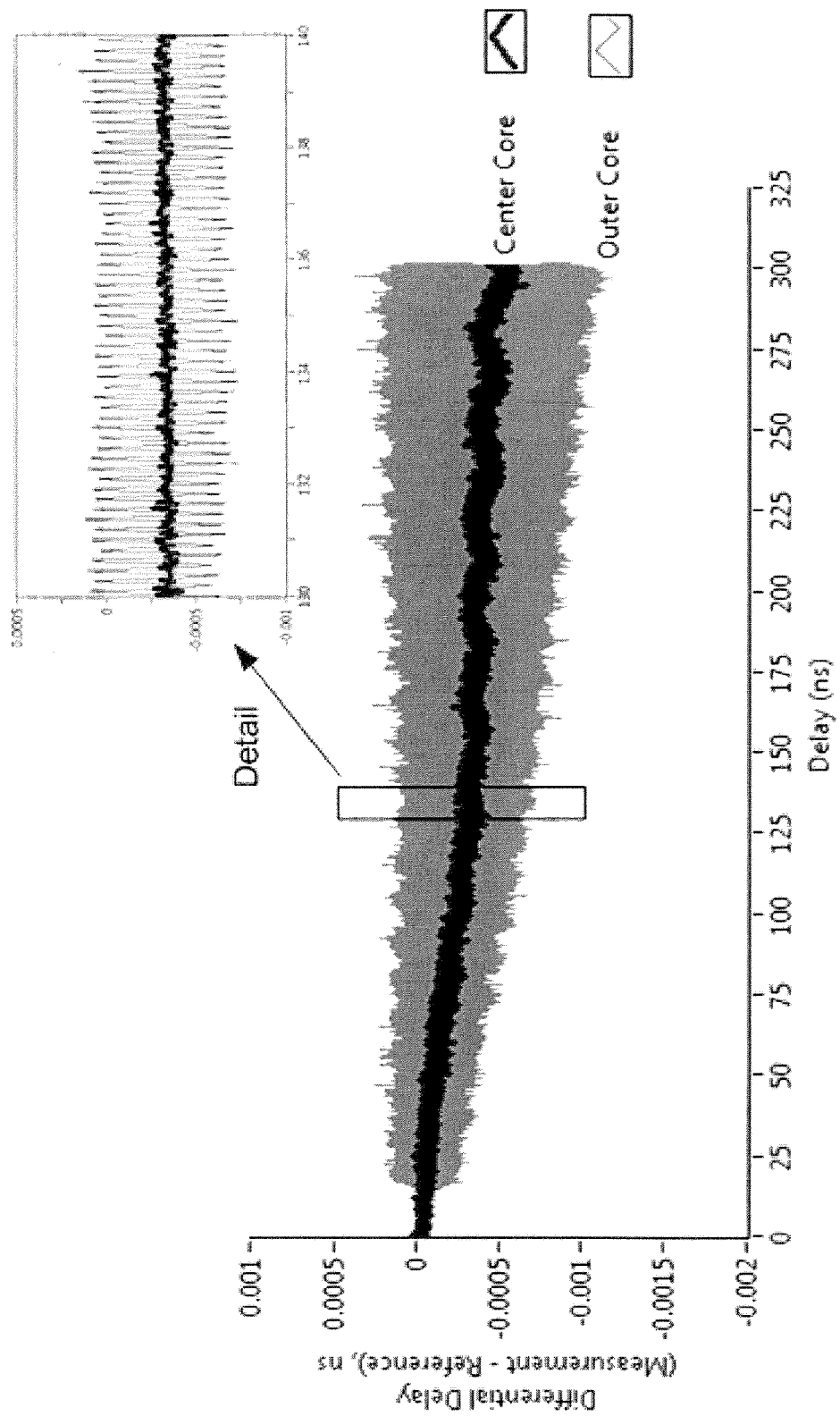
FIG. 20 is a graph of a differential delay signal from a tightly coiled shape sensing fiber processed without continuous dispersion correction.

Accurate tracking of delay is important for maintaining coherence between measurement and reference OFDR signals, particularly in the case of Rayleigh scatter sensors. FIG. 20 illustrates the effect that GVD mismatch has on the delay measurement. The delay signal shown in FIG. 17 was taken from the same OFDR shape sensing data described above. A differential delay signal from a tightly coiled shape sensing fiber processed without continuous dispersion correction is shown. Mismatched dispersion causes the delay calculation to produce an erroneous, oscillating delay signal on the outer core. The delay measurement in the outer core exhibits an oscillation whose amplitude increases with length down the fiber.

These delay oscillations are a result of the quadratic spectral domain phase response. GVD produces a quadratic spectral phase signal whose amplitude increases with measurement length. The differential delay calculation expects a linear phase response. Under a curvature, like the parabolic spectral phase signal, the shape sensing fiber produces an additional oscillating spectral shift. When applied to a GVD-corrected signal, this shift is falsely interpreted as a spectral domain phase slope, which is translated into an erroneous measurement of delay.

Figure 21:
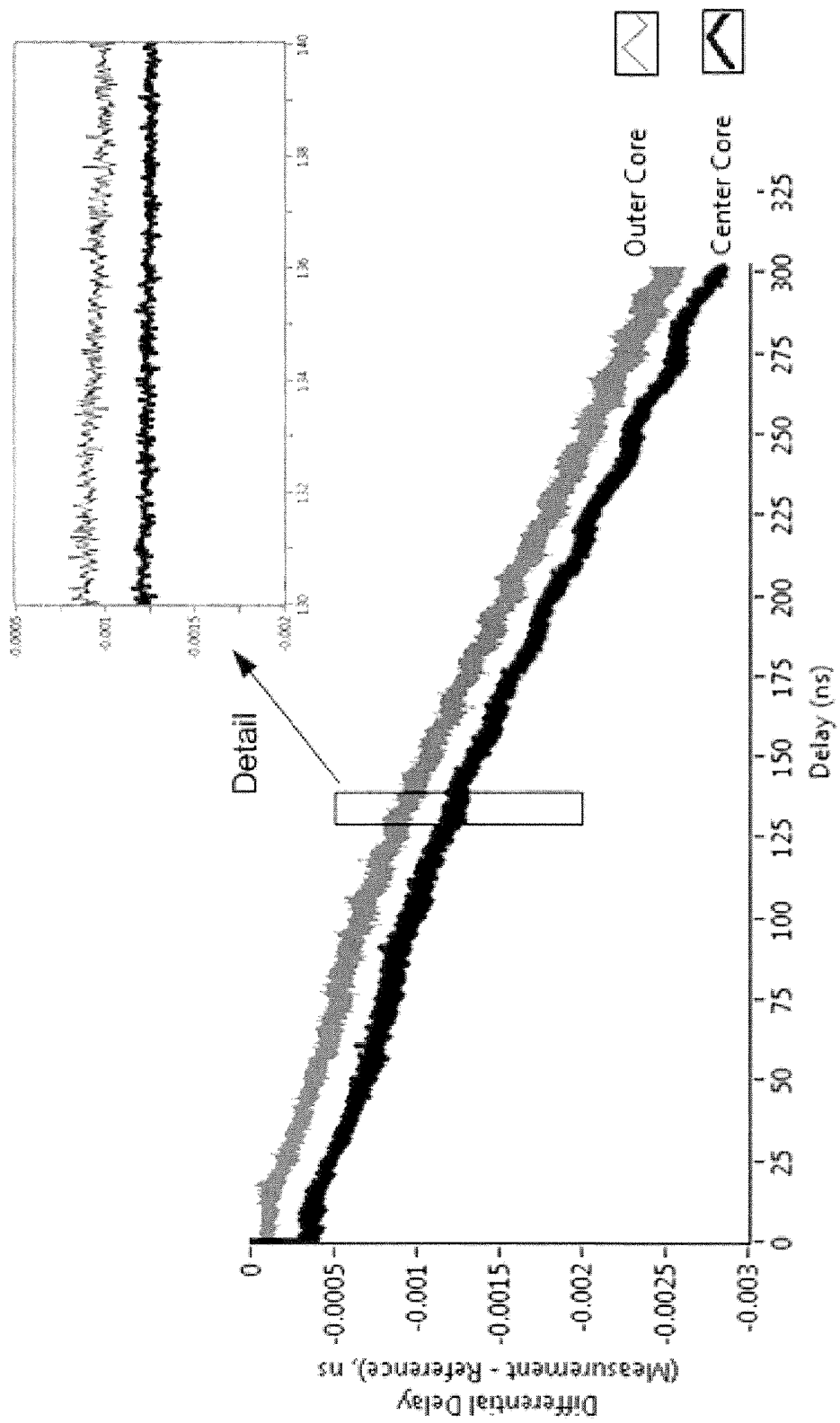
FIG. 21 is a graph of a differential delay signal from a tightly coiled shape sensing fiber processed with continuous dispersion correction.
Figure 22:
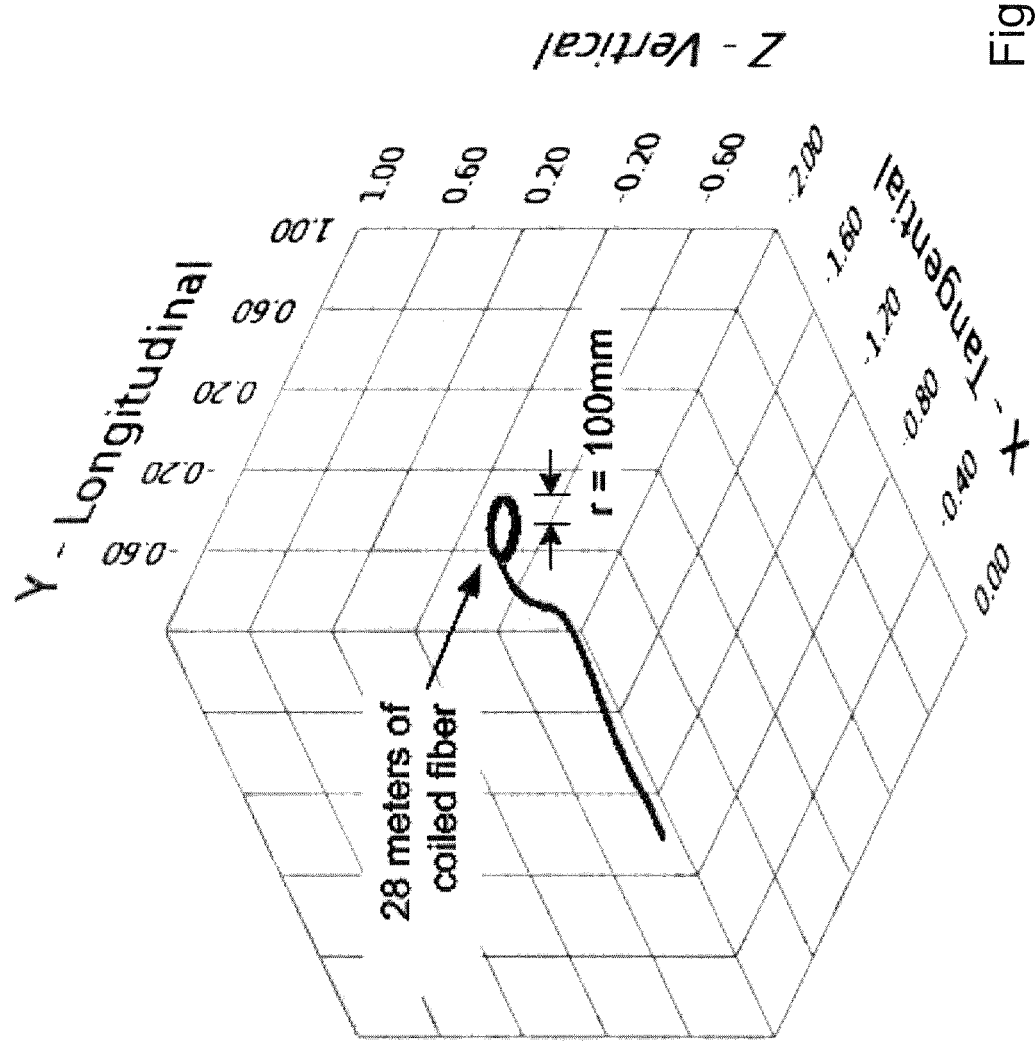
FIG. 22 shows a 3D shape measurement of an example 30m shape sensing fiber coiled in a 100 mm radius spool where the OFDR data is processed with continuous dispersion correction applied.

FIG. 21 shows the same measurement collected with continuous dispersion correction. The continuous GVD correction removes the oscillations in the delay signal, rendering the outer core delay similar to the center core. The high quality phase data in FIG. 19 demonstrates that this is a valid measurement of delay; if it were incorrect, the OFDR data would lack sufficient coherence to make a phase measurement. The resulting shape measurement, which accurately depicts a short length of straight fiber and the remaining 28 m in a tight coil, is shown in FIG. 22. Specifically, FIG. 22 illustrates a 3D shape measurement of 30 m shape sensing fiber coiled in a 100 mm radius spool where the OFDR data is processed with continuous GVD correction applied.

REFERENCES INCORPORATED HEREIN BY REFERENCE

[1] J. P. Von Der Weid, R. Passy, G. Mussi, and N. Gisin, "On the characterization of optical fiber network components with optical frequency domain reflectometry," *Lightwave Technology, Journal of*, vol. 15, no. 7, pp. 1131-1141, 1997.

[2] B. J. Soller, D. K. Gifford, M. S. Wolfe, and M. E. Froggatt, "High resolution optical frequency domain reflectometry for characterization of components and assemblies," *Optics Express*, vol. 13, no. 2, pp. 666-674, 2005.

[3] M. E. Froggatt, D. K. Gifford, S. Kreger, M. Wolfe, and B. J. Soller, "Characterization of polarization-maintaining fiber using high-sensitivity optical-frequency-domain reflectometry," *Lightwave Technology, Journal of*, vol. 24, no. 11, pp. 4149-4154, 2006.

[4] M. Froggatt, B. Soller, D. Gifford, and M. Wolfe, "Correlation and keying of Rayleigh scatter for loss and temperature sensing in parallel optical networks," in *Optical Fiber Communication Conference*, 2004.

[5] M. E. Froggatt, "Distributed Strain and Temperature Discrimination in Polarization Maintaining Fiber," U.S. Pat. No. 7,538,883 26 May 2009.

[6] M. Froggatt, "Distributed measurement of the complex modulation of a photoinduced Bragg grating in an optical fiber," *Applied optics*, vol. 35, no. 25, pp. 5162-5164, 1996.

[7] M. Froggatt and J. Moore, "High-spatial-resolution distributed strain measurement in optical fiber with Rayleigh scatter," *Applied Optics*, vol. 37, no. 10, pp. 1735-1740, 1998.

[8] M. E. Froggatt, J. W. Klein, D. K. Gifford, and S. T. Kreger, "Optical Position and/or Shape Sensing." U.S. Patent Application 2011/0109898 A1.

[9] W. Eickhoff and R. Ulrich, "Optical frequency domain reflectometry in single-mode fiber," *Applied Physics Letters*, vol. 39, no. 9, pp. 693-695, 1981.

[10] M. E. Froggatt and T. Erdogan, "System and method for measuring the transfer function of a guided wave device," U.S. Pat. No. 6,376,830 April-2002.

[11] M. Froggatt, R. J. Seeley, D. K. Gifford, and others, "High resolution interferometric optical frequency domain reflectometry (OFDR) beyond the laser coherence length," U.S. Pat. No. 7,515,276 April-2009.

[12] M. Froggatt, R. J. Seeley, and D. K. Gifford, "High Resolution Interferometric Optical Frequency Domain Reflectometry (OFDR) Beyond the Laser Coherence Length," U.S. Pat. No. 7,515,276 7 Apr. 2009.

[13] G. Keiser, *Optical fiber communications*. Mc Graw Hill, 1998.
[14] D. K. Gifford, M. E. Froggatt, and S. T. Kreger, "High precision, high sensitivity distributed displacement and temperature measurements using OFDR-based phase tracking," presented at the 21st International Conference on Optical Fiber Sensors, Ottawa, Canada, 2011, vol. 7753, p. 775331.

Although the description above contains specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

The invention claimed is:

1. A method for correcting an optical frequency domain reflectometry (OFDR) measurement produced by an OFDR apparatus that includes a tunable laser coupled to provided laser light over a range of wavelengths to a sensing interferometer and a monitor interferometer, the sensing interferometer also being coupled to an optical sensing waveguide used to measure strain on the optical sensing waveguide, the method comprising:
   processing in a spectral domain, by processing circuitry in the OFDR apparatus, waveguide sensing interferometric data with one or more compensation parameters to compensate, during the OFDR measurement as the waveguide sensing interferometric data is obtained, for optical dispersion associated with the waveguide sensing interferometer data, the waveguide sensing interferometric data obtained from distributed locations along the optical sensing waveguide by acquisition circuitry in the OFDR apparatus;
   performing, by the processing circuitry in the OFDR apparatus, a Fourier Transform of the dispersion-compensated waveguide sensing interferometric data to provide dispersion-compensated OFDR measurement information in a temporal domain for the distributed locations along the optical sensing waveguide, the dispersion-compensated OFDR measurement associated with the strain on the optical sensing waveguide;
   determining, by the processing circuitry in the OFDR apparatus, a differential delay of the dispersion-compensated OFDR measurement information relative to baseline OFDR measurement information associated with the optical sensing waveguide; and
   outputting information based on the differential delay.

2. The method in claim 1, further comprising calibrating the OFDR apparatus by adjusting the one or more compensation parameters while monitoring a calibration OFDR measurement to minimize dispersion in the calibration OFDR measurement.

3. The method in claim 1, wherein the one or more compensation parameters are modified to minimize optical dispersion at one location along the optical sensing waveguide.

4. The method in claim 1, wherein the one or more compensation parameters are modified to minimize accumulated optical dispersion along a continuous portion of the optical sensing waveguide.

5. The method in claim 1, wherein the one or more compensation parameters includes an optical dispersion offset, and wherein the processing in the spectral domain includes applying the optical dispersion offset to minimize optical dispersion at one location along the optical sensing waveguide.

6. The method in claim 5, wherein the processing further includes:
   resampling, during the OFDR measurement, the waveguide sensing interferometric data based on monitor interferometric data generated by the monitor interferometer;
   determining, during the OFDR measurement, the optical dispersion offset that matches a dispersion at the location along the sensing waveguide, wherein the optical dispersion offset includes a quadratic varying phase; and
   applying the optical dispersion offset to the resampled waveguide sensing interferometric data as the resampled waveguide sensing interferometric data is generated.

7. The method in claim 1, wherein the one or more compensation parameters includes multiple optical dispersion offsets, and wherein the processing includes applying the multiple optical dispersion offsets to minimize optical dispersion at multiple locations along the sensing waveguide.

8. The method in claim 1, wherein the processing includes applying, during the OFDR measurement, the one or more compensation parameters to minimize accumulated optical dispersion along a continuous portion of the sensing waveguide.

9. The method in claim 8, wherein the processing includes:
   monitoring a phase response of the monitor interferometer as the tunable laser sweeps through a range of optical frequencies, and
   modifying, during the OFDR measurement as the waveguide sensing interferometric data is obtained, a threshold value by a linearly changing value based on a continuous dispersion compensation parameter when an accumulated phase reaches a threshold value.

10. The method in claim 1, further comprising:
    determining a coherence of the OFDR measurement along a length of the optical sensing waveguide relative to a baseline OFDR measurement associated with the optical sensing waveguide, and
    processing the coherence based on the one or more compensation parameters.

11. The method in claim 1, further comprising:
    reducing broadening of the OFDR measurement along a length of the optical sensing waveguide based on the one or more compensation parameters.

12. An optical frequency domain reflectometry (OFDR) apparatus comprising:
    a tunable laser;
    a sensing interferometer coupled to the tunable laser to receive laser light over a range of wavelengths and configured to be coupled to an optical sensing waveguide used to measure strain;
    a monitor interferometer coupled to the tunable laser to receive laser light over the range of wavelengths; and processing circuitry coupled to the sensing interferometer and the monitor interferometer and configured to:
    process, in a spectral domain, an OFDR measurement including waveguide sensing interferometric data with one or more compensation parameters to:
        compensate, during the OFDR measurement as the waveguide sensing interferometric data is obtained, for optical dispersion associated with the waveguide sensing interferometer data, wherein the waveguide sensing interferometric data is obtained from distributed locations along the optical sensing waveguide, and
        provide dispersion-compensated waveguide sensing interferometric data;
    perform a Fourier Transform of the dispersion-compensated waveguide sensing interferometric data to provide dispersion-compensated OFDR measurement information in a temporal domain for the distributed locations along the optical sensing waveguide;
    determine a differential delay of the dispersion-compensated OFDR measurement information relative to baseline OFDR measurement information associated with the optical sensing waveguide; and
    output information based on the differential delay.

13. The apparatus in claim 12, wherein the processing circuitry is further configured to calibrate the OFDR apparatus by adjusting the one or more compensation parameters while monitoring a calibration OFDR measurement response to minimize dispersion in the calibration OFDR measurement.

14. The apparatus in claim 12, wherein the processing circuitry is further configured to modify the one or more compensation parameters to minimize optical dispersion at one location along the optical sensing waveguide.

15. The apparatus in claim 12, wherein the processing circuitry is further configured to modify the one or more compensation parameters to minimize accumulated optical dispersion along a continuous portion of the optical sensing waveguide.

16. The apparatus in claim 12, wherein the one or more compensation parameters includes an optical dispersion offset, and wherein the processing circuitry is further configured to apply the optical dispersion offset, during the OFDR measurement as waveguide sensing interferometric data is obtained, to minimize optical dispersion at one location along the sensing waveguide.

17. The apparatus in claim 16, wherein the processing circuitry is further configured to:
    resample the waveguide sensing interferometric data, during the OFDR measurement as the waveguide sensing interferometric data is obtained, based on monitor interferometric data;
    determine the optical dispersion offset that matches a dispersion at the location along the waveguide, wherein the optical dispersion offset includes a quadratic varying phase; and
    apply the optical dispersion offset to the resampled waveguide sensing interferometric data as the resampled waveguide sensing interferometric data is generated.

18. The apparatus in claim 12, wherein the one or more compensation parameters includes multiple optical dispersion offsets, and wherein the processing circuitry is further configured to apply the optical dispersion offsets, during the OFDR measurement as waveguide sensing interferometric data is obtained, to minimize optical dispersion at the distributed locations along the sensing waveguide.

19. The apparatus in claim 12, wherein the processing circuitry is further configured to apply the one or more compensation parameters, during the OFDR measurement as waveguide sensing interferometric data is obtained, to minimize accumulated optical dispersion along a continuous portion of the sensing waveguide.

20. The apparatus in claim 12, wherein the processing circuitry is further configured to:
    monitor a phase response of the monitor interferometer as the tunable laser sweeps through a range of optical frequencies, and
    modify, during the OFDR measurement as waveguide sensing interferometric data is obtained, a threshold value by a linearly changing value based on a continuous dispersion compensation parameter when an accumulated phase reaches a threshold value.

21. The apparatus in claim 12, wherein the processing circuitry is further configured to:
    determine a coherence of the OFDR measurement along a length of the optical sensing waveguide relative to a baseline OFDR measurement associated with the optical sensing waveguide, and
    process the coherence based on the one or more compensation parameters.

22. The apparatus in claim 12, wherein the processing circuitry is further configured to:
    reduce broadening of the OFDR measurement along a length of the sensing waveguide based on the one or more compensation parameters.

23. An optical frequency domain reflectometry (OFDR) apparatus comprising:
    a tunable laser;
    a sensing interferometer coupled to the tunable laser to receive laser light over a range of wavelengths and configured to be coupled to an optical sensing waveguide used to measure strain;
    a monitor interferometer coupled to the tunable laser to receive laser light over the range of wavelengths; and
    processing circuitry coupled to the sensing interferometer and the monitor interferometer and configured to:
        monitor a phase response of the monitor interferometer as the tunable laser sweeps through the range of wavelengths;
        process, in a spectral domain, an OFDR measurement including waveguide sensing interferometric data with one or more compensation parameters to:
            compensate the waveguide sensing interferometric data for optical dispersion associated with the waveguide sensing interferometric data, wherein the waveguide sensing interferometric data is obtained from distributed locations along the optical sensing waveguide, and
            provide dispersion-compensated waveguide sensing interferometric data;
        perform a Fourier Transform of the dispersion-compensated waveguide sensing interferometric data to provide dispersion-compensated OFDR measurement information in a temporal domain for the distributed locations along the optical sensing waveguide; and
        modify a threshold value by a linearly changing value based on a continuous dispersion compensation parameter when an accumulated phase reaches a threshold value.

24. The apparatus in claim 23, wherein the processing circuitry is further configured to:

resample the waveguide sensing interferometric data, during the OFDR measurement as the waveguide sensing interferometric data is obtained, based on monitor interferometric data;

determine the optical dispersion offset that matches a dispersion at a location of the locations along the waveguide, wherein the optical dispersion offset includes a quadratic varying phase; and apply the optical dispersion offset to the resampled waveguide sensing interferometric data as the resampled waveguide sensing interferometric data is generated.

25. The apparatus in claim 23, wherein the processing circuitry is further configured to output the dispersion-compensated OFDR measurement information associated with the strain measured by the optical sensing waveguide.

* * * * *